United States Patent [19]
Madden et al.

[11] Patent Number: 5,786,823
[45] Date of Patent: Jul. 28, 1998

[54] METHOD AND APPARATUS EMPLOYING COMPOSITE TRANSFORMS OF INTERMEDIARY IMAGE DATA METRICS FOR ACHIEVING IMAGING DEVICE/MEDIA COMPATIBILITY AND COLOR APPEARANCE MATCHING

[75] Inventors: Thomas Ethan Madden, East Rochester; Edward Joseph Giorgianni, Rochester, both of N.Y.

[73] Assignee: Eastman Kodak Company, Rochester, N.Y.

[21] Appl. No.: 536,016

[22] Filed: Sep. 29, 1995

Related U.S. Application Data

[63] Continuation-in-part of Ser. No. 59,060, May 7, 1993.

[51] Int. Cl.[6] .................................................. G06K 9/38
[52] U.S. Cl. .................................................. 345/431
[58] Field of Search .................. 395/131; 364/754; 358/515–525; 345/431

[56] References Cited

U.S. PATENT DOCUMENTS

| | | | |
|---|---|---|---|
| 3,763,365 | 10/1973 | Seitz | 364/754.02 |
| 4,500,919 | 2/1985 | Schreiber | 358/518 |
| 4,958,220 | 9/1990 | Alessi et al. | 358/527 |
| 4,979,032 | 12/1990 | Alessi et al. | 358/527 |
| 5,021,891 | 6/1991 | Lee | 358/432 |
| 5,101,440 | 3/1992 | Watanabe et al. | 382/168 |
| 5,191,645 | 3/1993 | Carlucci et al. | 345/328 |
| 5,208,911 | 5/1993 | Newman et al. | 395/514 |
| 5,267,030 | 11/1993 | Giorgianni et al. | 358/527 |
| 5,305,119 | 4/1994 | Rolleston et al. | 358/522 |
| 5,420,979 | 5/1995 | Madden et al. | 395/501 |
| 5,434,931 | 7/1995 | Quardt et al. | 382/271 |

*Primary Examiner*—Anton Fetting
*Attorney, Agent, or Firm*—Charles E. Wands

[57] ABSTRACT

An image signal transform mechanism employs one or more composite transforms that convert image bearing-signals corresponding to unrendered input images into output device-associated colorimetry values. Through a first sequence of transformations, the image bearing signals are related to database color encoding values. The database color encoding values incorporate corresponding colorimetric values required to match, in an encoding viewing environment, the appearance of the images in the input viewing environment. Through a second transformation sequence the database color encoding values are transformed into modified colorimetry values in terms of a viewing environment. Through a third transformation sequence, the modified colorimetry values are related to the output device-associated colorimetry values. The at least one composite transform (e.g., a single transform) is representative of plural transformations (all or some) within the first, second and third transformations sequences.

22 Claims, 16 Drawing Sheets

METHOD AND APPARATUS EMPLOYING COMPOSITE TRANSFORMS OF INTERMEDIARY IMAGE DATA METRICS FOR ACHIEVING IMAGING DEVICE/MEDIA COMPATIBILITY AND COLOR APPEARANCE MATCHING

CROSS-REFERENCE TO RELATED APPLICATIONS

The present application is a continuation-in-part of our U.S. patent application Ser. No. 08/059,060 (hereinafter referenced as the '060 application), filed May 7, 1993, entitled: "METHOD AND ASSOCIATED APPARATUS WHICH ACHIEVE IMAGING DEVICE/MEDIA COMPATIBILITY AND COLOR APPEARANCE MATCHING," assigned to the assignee of the present application and the disclosure of which is herein incorporated. Additionally, U.S. patent application Ser. No. 08/002,497, filed Jan. 6, 1993, by S. Ring and E. Giorgianni, entitled: "DIGITAL COLOR SYSTEM AND METHOD WHICH PROVIDES VISUAL MATCH ACROSS DIFFERENT INPUT AND OUTPUT VIEWING CONDITIONS," is related and assigned to the assignee of the present application.

FIELD OF THE INVENTION

The present invention relates in general to color image reproduction, and is particularly directed to a color image reproduction method and apparatus, that employ composite transforms for input, intermediary and output image data metrics, for achieving compatibility for disparate imaging media, used together for input, output, manipulation and/or storage, such that the color appearance of input images is retained.

BACKGROUND OF THE INVENTION

As described in our above-referenced '060 application, color-image reproduction systems known in the art permit images to be captured by certain image-receptive media or devices, possibly digitized and stored, and then output onto complementary media. For example, color images may be first captured on negative film and then reproduced on negative photographic paper. Such images may or may not pass through a digital intermediary. In another case, color images may be captured on positive photographic materials, known as transparencies, and then viewed directly by projection or back-illumination, or copied onto larger or smaller transparencies, or printed onto positive photographic paper. Again, such images may or may not pass through a digital intermediary. In yet another case, color images may be captured as an electronic signal by a video camera, and then viewed on a video monitor or converted to print by a device such as a thermal printer. Again, such images may or may not pass through a digital intermediary. The foregoing are just some examples of color-image reproduction systems to which the invention to be described in detail hereinafter may be applied. However, it is to be understood that the present invention is not limited to such examples, but may be applied to other color-imaging systems as well, for instance to the reproduction of reflection originals using photographic, electrostatic, or other means.

Color-imaging systems in which the image passes through a digital intermediary allow improvements to be made to an image using a single means which may be a digital computer. Thus, improvements to an image's color and tone scale as well as to its sharpness and noise can be made in a convenient and adaptable way. Furthermore, if the imaging system provides for rapid viewing of the changes, the content of an image can also be edited in a convenient fashion. Many of these types of improvements are known to those skilled in the art.

For example, U.S. Pat. No. 4,500,919 entitled "COLOR REPRODUCTION SYSTEM" by W. F. Schreiber, discloses an image reproduction system, in which an electronic reader scans an original color image and converts it to an electronic image. A computer workstation and an interactive operator interface, including a video monitor, permit an operator to edit an image by means of displaying it on the monitor. When the operator has composed a desired image on the monitor, the workstation causes the output writer device to make an inked output of the reproduced image. Such systems are often referred to as "hybrid" imaging systems, because they combine elements of photographic or other chemical-based imaging together with various elements of electronic imaging systems.

A hybrid color-imaging system of significantly greater value would have the ability to produce appropriately rendered reproductions of input images from any of a plurality of original image-receptive media and/or devices using any of a plurality of output image-receptive media and/or devices regardless of the origin of the original input image. If this capability is incorporated in a hybrid imaging system, images originally captured on negative film, for instance, may be displayed on a video monitor, as well as printed onto negative or positive photographic films or papers. Likewise, images originally captured on positive film could be shown on a video monitor, as well as printed onto negative or positive photographic films or papers.

In addition, images from various reflection media could be shown on a video monitor as well as be printed onto negative or positive photographic films or papers, or video or other forms of electronic images could be printed onto negative or positive photographic films or papers. Furthermore images from any of these input sources could be printed using a thermal, ink-jet, or electrostatic printing means as well as many other means known in the art. In all cases, it would be desirable for the final printed or displayed images to appear appropriately rendered for the reproduction medium selected to produce and/or display the final image and for the specific application of that final image.

An improved color-imaging system would also provide the capability of storing image-bearing signals or digitized images for later display in such a manner that the display device, whether it produces hard copy using photographic paper, thermal dye transfer, electrostatic, or any other printing means, or a soft copy such as a video image, is not required to make any adjustments based on the original image capture medium or image source in order to make appropriately rendered reproductions of said images.

An improved color-imaging system would further provide the capability to produce output images, from various input media or sources, that are appropriately rendered using any of a number of output or display means. In each case, images would be rendered in a way that is appropriate based on the capabilities and limitations of the specific output device and/or medium and on the specific application for which the image is being produced.

An improved color-imaging system would additionally provide the capability to mix portions of images from various input media or sources and to then produce an appropriately rendered composite image using any of the various output and display means. For instance, one might wish to merge a portion of an image captured on one medium, such as positive transparency film, with a portion of an image captured on another medium, such as color negative film, and produce a single composite image on another medium, such as a video display, so that the entire composite image has an homogeneous and appropriate appearance.

A final consideration for an improved color-imaging system is that, in order to optimally display or reproduce color images, it is often necessary to correct for variations in overall exposure and color balance due to exposure control errors of image capturing devices, variations in color temperature of the taking illuminants, and other factors. These balance adjustments are particularly important for an imaging system which has the previously described capability to merge portions of several images into a composite image. Different balance adjustments, and other types of image modifications, may be necessary for each input image in order to produce a completely homogeneous-appearing composite image. A practical color-imaging system should therefore provide a convenient means to apply these balance adjustments and other image modifications. An improved hybrid color-imaging system would further provide this capability without requiring references to the origin of the input image.

Those skilled in the art will recognize the particular difficulty of successfully exchanging, storing, adjusting, and producing homogeneous-appearing composite images of merged imaging data when disparate sources of input, many of which may not be designed specifically for use in hybrid imaging systems, are to be included as potential inputs to such imaging systems.

Images on photographic films and papers, for example, are frequently used as input for hybrid imaging systems; yet these media are generally not designed specifically for purposes directly related to hybrid imaging. They are instead most often designed for direct viewing by a human observer or for printing onto other photographic materials. The different requirements for photographic negatives, photographic prints, photographic transparencies, graphic arts prints, and other forms of images result in a disparity and an inherent incompatibility among potential input image types. Image data typically derived from disparate input sources is incompatible in that it can not be directly exchanged, stored, adjusted, used to produce homogeneous-appearing composite images, or sent to an output device without requiring knowledge of the origin of each input image.

As detailed in our '060 application, there are two fundamental causes of this incompatibility among image types. The first is the fact that most positive imaging media are designed to be directly viewed by a human observer in a specific viewing environment. Reflection prints and most pieces of artwork, for example, are designed to be observed in a normal viewing environment, i.e., where the illumination of the image is similar in luminance level and chromaticity to the illumination of the rest of the viewing environment. Transparencies, on the other hand, are often designed to be projected in a darkened room or illuminated by back-light. These and other differences in the viewing environment will cause significant differences in a human observer's perception of an image. Imaging media designed for direct viewing by a human observer must, therefore, be designed for specific intended viewing environments. Each medium must be designed so as to properly compensate for perceptual effects that its associated viewing environment will induce in the human observer.

A measuring device, such as an input scanner employed in a hybrid imaging system, is of course not subject to the same perceptual effects as the human observer. As a consequence, measurements of images on disparate media will not directly correspond to the appearances of images on such media, even if those measurements correspond to CIE or other colorimetric standards and recommended practices. For example, if a typical 35 mm photographic transparency is measured colorimetrically and that colorimetry is exactly reproduced on a reflection print, the reflection print will appear to be extremely dark, much too high in luminance contrast, and cyan-blue in overall color balance. This is because the transparency material has been specifically designed to be viewed in a darkened room where perceptual effects such as general brightness adaptation, lateral brightness adaptation, and partial chromatic adaptation will be induced in the human observer such that the transparency image will appear to be properly rendered in that particular viewing environment. Because the measured colorimetric values for the transparency designed for dark projection do not correspond to the visual appearance of that transparency, colorimetric data scanned from that transparency is incompatible with data scanned from a reflection print or from any other form of image designed to be viewed in a normal viewing environment.

U.S. patent application Ser. No. 08/002,497 (hereinafter referenced as the '497 application) entitled: "DIGITAL COLOR SYSTEM AND METHOD WHICH PROVIDES VISUAL MATCH ACROSS DIFFERENT INPUT AND OUTPUT VIEWING CONDITIONS" addresses one aspect of perceptual adaptation—chromatic adaptation. That application describes a color management system which transforms measured colorimetric values from images in a way that produces the corresponding colorimetric values that would be required to visually match the appearance of that image in a defined reference viewing environment.

The invention described in the '060 application addresses other perceptual issues, not addressed in the '497 application, including the incompleteness of the observer's chromatic adaptation, lateral brightness adaptation (which can affect the observer's perception of luminance contrast), and general brightness adaptation (which affects the observer's perception of brightness) as they apply to input image incompatibility. The invention described in the '060 application also addresses a second fundamental cause of incompatibility among input images that is also not addressed by the invention of the '497 application. This second fundamental incompatibility results because some input sources, such as photographic negatives and some forms of digital images, do not contain rendered output imaging information, i.e., information relating directly to an image intended to be viewed directly by an observer. These input sources produce rendered output images, intended for viewing, only when printed or otherwise output to an appropriate device and/or medium. Colorimetric data measured directly from such input sources is therefore fundamentally incompatible with colorimetric data measured directly from reflection prints, slides, and other forms of rendered images. Colorimetric data measured directly from a photographic negative, for example, would essentially correspond to the appearance of the negative itself rather than to a rendered positive image that would result if, for example, the negative were to be optically printed on to a photographic paper using an enlarger or other printing means.

As a result of these two fundamental causes of input image incompatibility, imaging data derived from photographic negatives, photographic transparencies, photographic and other forms of reflection images, and electronic sources of input cannot be used together to meet the interchange, storage, adjustment, and image-merging objectives described for this invention unless such data are given special treatment.

U.S. Pat. No. 5,267,030, entitled: "Methods And Associated Apparatus for forming Image Data Metrics which Achieve media Compatibility for Subsequent Imaging Applications," filed by E. Giorgianni and T. Madden, provides one method for meeting these stated objectives. In that application, a system is described in which compatibility of the input images is achieved by removing, as far as possible, all media-specific properties of each input medium. Compatibility is achieved by the transformation of each input to a common meaning or interpretation, i.e., the colorimetry of the original scene, or other source of exposure, which caused the input image to form on the input imaging device and/or medium.

While that solution is optimal for certain types of imaging systems, other types of systems may have different objectives which cannot be achieved by that approach. In graphic arts and desktop imaging, for example, the input image to be scanned, not the original scene, is generally considered to be the original image, and the imaging system must be capable of making a copy or other type of reproduction that is a visual match of the input image. In addition, these types of imaging systems may also require the capability for the straightforward generation of colors to user-provided colorimetric specifications.

Advantageously, the invention detailed in the above-referenced '060 application provides a new and improved mechanism for achieving compatibility among inherently disparate forms of image inputs and for image storage, adjustment, manipulation and merging in a way that additionally provides the capability to produce copies and other forms of appearance matches on any of a plurality of output devices and media and under any of a plurality of output viewing conditions. The invention described in the '060 application is capable of producing colorimetrically specified colors on any output device and/or medium.

More particularly, in accordance with a preferred embodiment of the '060 invention, a color encoding system is provided which includes colorimetric values specified for an encoding viewing environment, which is defined in terms of associated viewing flare characteristics, associated relative luminances of images and image surrounds, and associated adaptive white point. Image bearing-signals derived from a first image source or imaging means are encoded into color encoding values incorporating corresponding colorimetric values required to match, in an encoding viewing environment, the appearance of subsequent images rendered from the first imaging means by a second imaging means, the subsequent images being associated with an input viewing environment.

The '060 encoding scheme is operative to generate test colors, using the first image source, means, the test colors representing samples of the color range of the first image source. Using the first image source test colors, rendered test colors are formed on the second imaging means. Colorimetric values of the rendered test colors are determined for the illuminant associated with the input viewing environment. These colorimetric values are adjusted in accordance with the difference in the viewing flare characteristics associated with the input and the encoding viewing environments, so as to form flare-adjusted colorimetric values. The flare-adjusted colorimetric values are adjusted in accordance with the difference between the relative luminances of the light illuminating images and light illuminating the areas immediately surrounding the images associated with the input and the encoding viewing environments, to thereby form 'surround-adjusted' colorimetric values. These surround-adjusted colorimetric values are then adjusted in accordance with the difference between the adaptive white points associated with the input and the encoding viewing environments, so as to form color encoding values. The rendered test colors are also sensed to form image-bearing signals, and at least one transformation is formed by relating the thus formed image-bearing signals to the color encoding values. In particular, a data-set, from which transformations are derived, converts image-bearing signals from input reflection prints, and other image-receptive media viewed in input viewing environments, in which the surround corresponds to the surround associated with the reference viewing environment, to the color encoding values.

The mechanism detailed in the '060 application is operative to provide calibration of color-imaging systems which achieve media compatibility for subsequent imaging applications, so that encoded images can be output onto any of a plurality of image-receptive media or image-forming devices, whereby the reproduced images appear appropriately rendered for the output medium or device chosen regardless of the input image origin. Images may be stored for later use without requiring documentation of their origin, images or portions thereof from various media and devices may be merged together to produce composite images of homogeneous and appropriate appearance, and images may be balanced and otherwise manipulated or adjusted without requiring references to their origin.

As further described in the '060 application, image-bearing signals, such as those produced by scanning, with a reflection or transmission scanner, sources of rendered (i.e., in a form intended to be viewed directly) input images, are converted to a novel image manipulation and/or storage encoding, wherein the encoding is equal to the corresponding colorimetric values that would be required to match, in the viewing conditions of a uniquely defined reference viewing environment, the appearance of an input image as that image would appear if viewed in a specified input viewing environment. The viewing conditions of the reference viewing environment may correspond to an actual viewing environment, or they may instead correspond to an idealized viewing environment. The viewing conditions of the specified input viewing environment may correspond to an actual input viewing environment, or they may instead correspond to those of a viewing environment generally intended for the type of input imaging device or medium.

Image-bearing signals from unrendered (i.e., not in a form intended to be viewed directly) input images, such as those scanned from a photographic negative or those provided by an electronic source, are first computationally rendered for a specified complementary image-producing device and/or medium and viewing environment to produce a computationally rendered image. The input image is encoded in terms of the colorimetric values that would be required to match, in the viewing conditions of the reference viewing environment, the appearance of the computationally rendered input image as it would appear if viewed in the specified input viewing environment.

When such techniques are used together in a color-imaging system, image data from all rendered input images, including images from media that are intended to be viewed under different viewing conditions, are made compatible with each other. In addition, image data derived from rendered input images is made compatible with image data derived from unrendered input images. Furthermore, all image data so encoded are compatible with color data entered directly by colorimetric specification.

As described in the '060 application, the operations required to perform various transformations may consist of a sequence of matrix operations, one-dimensional look-up tables, polynomial or other mathematical expressions, three-dimensional look-up tables, or other computational techniques. Such sequential transformation, however, is undesirably slow, especially where a large number of transformation operations are conducted.

SUMMARY OF THE INVENTION

In accordance with the present invention, advantage is taken of the transformation compositing mechanisms described in U.S. Pat. No. 5,208,911 (hereinafter referenced as the '911 Patent), by G. Newman et al, entitled: "METHOD AND APPARATUS FOR STORING AND COMMUNICATING A TRANSFORM DEFINITION WHICH INCLUDES SAMPLE VALUES REPRESENTING AN INPUT/OUTPUT RELATION OF AN IMAGE TRANSFORMATION," issued May 4, 1993, and U.S. Pat. No. 5,420,979 (hereinafter referenced as the '979 Patent), by E. Giorgianni et al, issued May 30, 1995, to enhance the throughput of the image processing scheme detailed in our '060 application. Pursuant to the transform compositing mechanisms described in the '911 Patent and the '979 Patent, a plurality of transform definitions available for use by the image processing system are stored in an image data transform library. Each transform definition includes sample values representing an input/output relation of a predetermined image data transformation.

In response to prescribing a sequence of plural image transformation operations to be performed in an imagery data processing flow path, which path includes a path segment from an input source to an intermediary image parameter space, a path segment through that space, and a path segment from the intermediary image parameter space to a target output device, a plurality of transform definitions are automatically selected from the library. From the sequence of selected transform definitions, a 'composite' transform definition is automatically generated containing sample values of an input/output relation of the image data transformation sequence. The composite transform is preferably compiled and stored for immediate or later use by the color-imaging system. For example, the composite transform may be stored in any of a variety of storage media, such as, but not limited to, magnetic storage media, optical storage media (such as an optical compact disc), etc.

As described in the '911 Patent and the '979 Patent, the composite transform definition may be generated by preparing at least one multi-dimensional grid table containing the sample values of the composite transform definition. To prepare a multi-dimensional composite grid table, the selected transform definitions may be ordered in a specified sequence such that the data values generated by each transform are in terms of the coordinate space and quantization required by the next transform in the sequence. A plurality of representative input data values are then selected and sequentially processed according to the specified sequence of transform definitions to produce corresponding transform output values. To apply a composite transform definition to the values representative of the pixels of a digitized input image, at least one sample value is selected from the composite transform definition, based upon the value of an input pixel to be transformed. A processed pixel value is then determined based upon the at least one selected sample value.

As further described in the '911 Patent and the '979 Patent, transform definitions stored in the library may include predetermined transform definitions and custom transform definitions formed in accordance with user inputs. Stored transform definitions allow intermediary data values to be produced from the image-bearing signals of input imaging sources. A user's instructions may also specify a new set of transform definitions for use with a new input image source. A custom transform definition for the new input image source may then be prepared for transforming the image-bearing signals of the new image source to an intermediary data metric. Such custom transforms may be created by modifying predetermined transforms or by generating entirely new transforms. Generating and employing composite transforms allows images from any medium or source to be appropriately rendered on another medium or device without requiring documentation of their origins, and images or portions thereof may be merge together to produce images of homogeneous and appropriate appearance.

Thus, in accordance with the image signal transform mechanism of the present invention, one or more composite transforms that convert image bearing-signals corresponding to unrendered input images into output device-associated colorimetry values are employed. Through a first sequence of transformations, the image bearing signals are related to database color encoding values. The database color encoding values incorporate corresponding colorimetric values required to match, in an encoding viewing environment, the appearance of the images in the input viewing environment. Through a second transformation sequence the database color encoding values are transformed into modified colorimetry values in terms of a viewing environment. Through a third transformation sequence, the modified colorimetry values are related to the output device-associated colorimetry values. The at least one composite transform (e.g., a single transform) is representative of plural transformations (all or some) within the first, second and third transformations sequences.

DETAILED DESCRIPTION OF THE INVENTION

Figure 1:
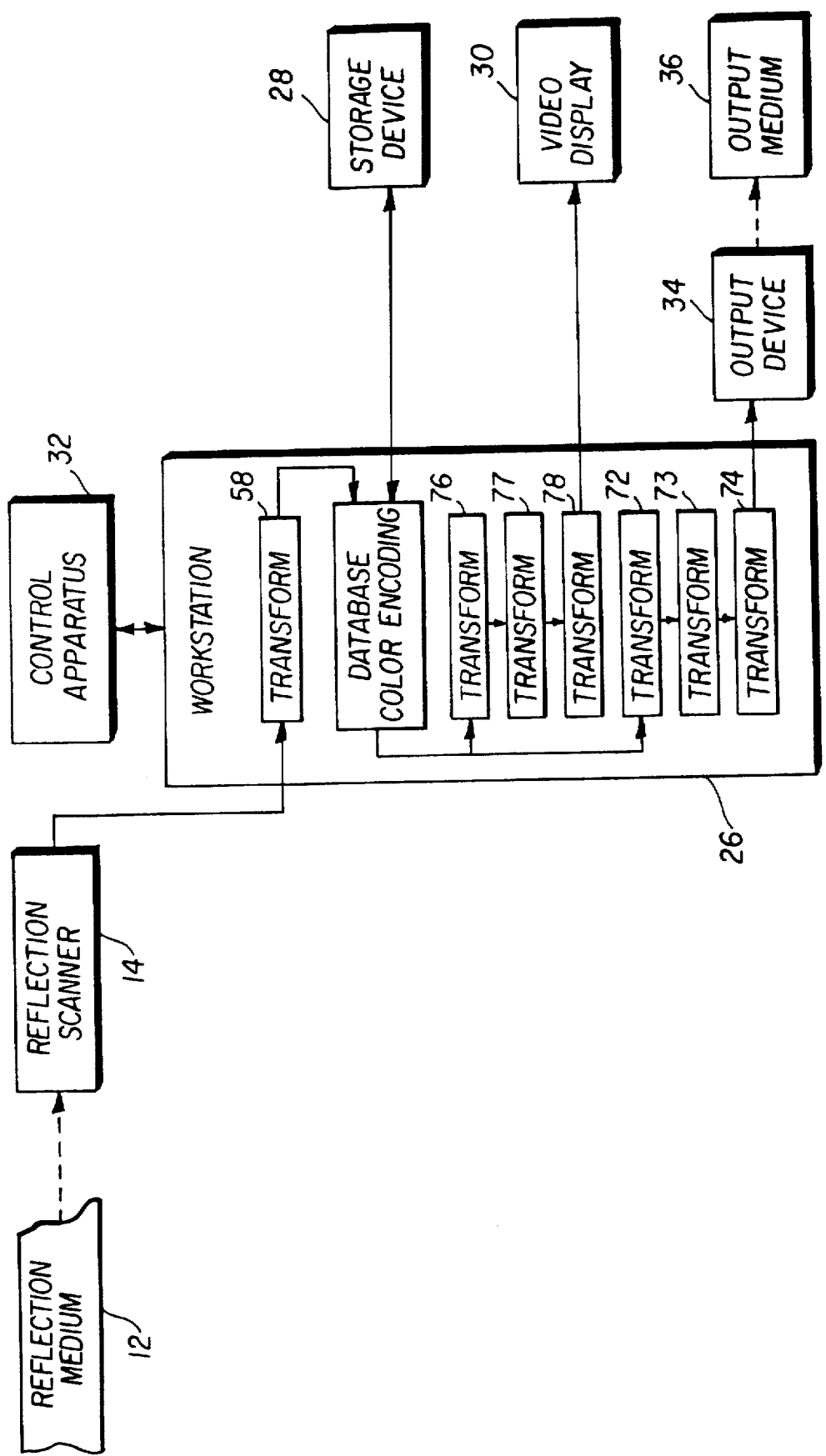
FIG. 1 is a block diagram of an embodiment of a color encoding mechanism described in the above-referenced '060 application.

Before describing in detail the new and improved composite image transform-containing color image reproduction mechanism in accordance with the present invention, it should be observed that the present invention resides primarily in what is effectively a prescribed digital image processing technique that may be implemented by means of conventional digital signal processing circuitry or may be embedded within image processing application software executable by the control processor of a digital image processing workstation, through which digitally encoded images are processed. The sources of such images, per se, are not considered part of the invention.

Consequently, the manner in which such image sources are interfaced with either hardwired digital circuit components or a digital image processing workstation have been illustrated in the drawings in readily understandable block diagram format, which show only those specific details that are pertinent to the present invention, so as not to obscure the disclosure with details which will be readily apparent to those skilled in the art having the benefit of the description herein. Thus, the block diagram illustrations are primarily intended to illustrate the major components of the system in a convenient functional grouping, whereby the present invention may be more readily understood.

Attention is initially directed to FIG. 1, which shows, in block diagram form, a first embodiment of the color image reproduction mechanism described in the above-referenced '060 application. As illustrated, one or more reflection scanners 14 are operative to scan input images on one or more reflection media 12 and produce image-bearing signals in digital form for each picture element of a reflection image being scanned. A computer-based workstation 26, which receives the image-bearing signals, transforms the input image-bearing signals into an intermediary image data encoding. Workstation 26 also allows for archival storage of the intermediary image data using any of a variety of archival storage devices 28, and media such as magnetic tape or disk, or optical disk. Workstation 26 also enables an operator/user to modify (color and/or composition) the original image to construct the image for reproduction.

For this purpose, a video display 30 is operative to display an image corresponding to video-transformed image-bearing signals provided by the workstation. A control apparatus 32, which may include a keyboard and cursor, enables the operator to provide image manipulation commands pertinent to modifying the video image displayed and the reproduced image to be made or stored. One or more output devices, 34, which may be film writers, thermal, ink-jet, electrostatic, or other type of printers, or electronic output devices, then receive modified and output-transformed image-bearing signals from the workstation for output onto appropriate output media 36.

In accordance with the embodiment diagrammatically illustrated in FIG. 1, image-bearing signals generated by scanning reflection medium (print) 12 with reflection scanner 14 are applied to an image manipulation and/or storage encoding mechanism, referred to as a database color encoding mechanism, and correspond to colorimetric values that would be required to match, in the viewing conditions of a uniquely defined reference viewing environment, the appearance of an input image as that image would appear if viewed in a specified input viewing environment. The specified input environment may correspond to an actual viewing environment or to the viewing environment generally associated with the reflection input imaging medium. The reference viewing environment need not correspond to any actual environment. It may instead be defined to be conceptually or mathematically convenient, for example. As defined in the '060 application, the reference viewing environment is uniquely defined in terms of:

1) Surround—a description of the relationship of the luminance and chrominance of the light illuminating the image to the luminance and chrominance of the areas immediately surrounding the image;

2) Adaptive white point—a white reference, the luminance of which would appear to correspond to that produced by a 100% diffuse reflecting white object, and the chromaticities of which would appear achromatic (neutral) to an observer adapted to the viewing environment; and 3) Viewing flare—the amount of non-image stray light in the environment that reaches the eyes of the observer, which may be expressed as a percentage of the luminance level associated with the reproduction of a 100% diffuse reflecting white object in the original scene;

The specified input viewing environment for each input image is also defined in terms of surround, adaptive white point, and viewing flare. In addition, the spectral power distribution of the viewing illuminant is specified in order to perform the required colorimetric measurements and/or computations.

The encoding mechanism described in the '060 application generates a data-set, from which transformations are derived to convert image-bearing signals from input reflection prints, and other image-receptive media viewed in input viewing environments in which the surround corresponds to the surround associated with the reference viewing environment, to the database color encoding values.

Figure 2:
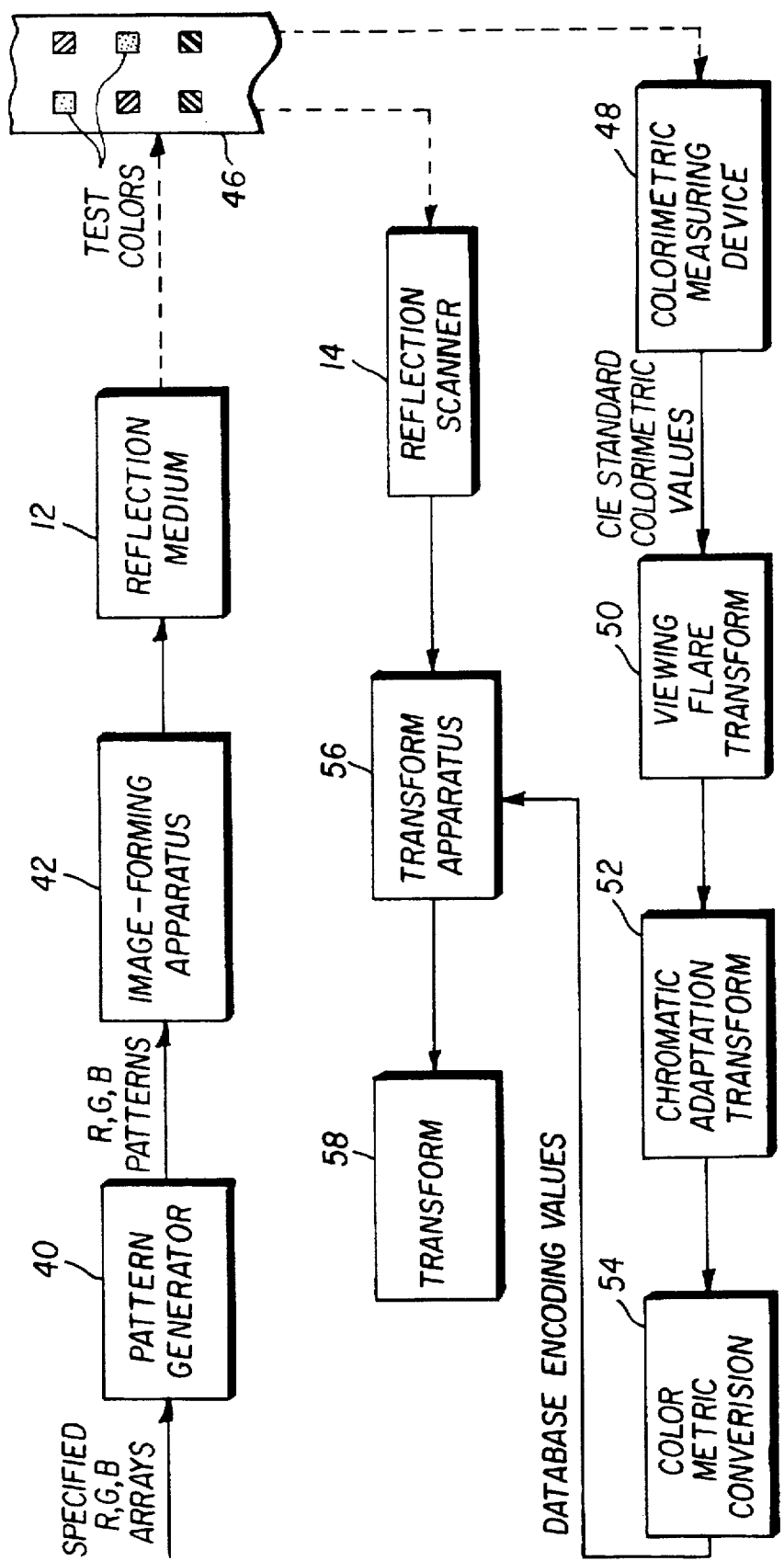
FIG. 2 is a detailed block diagram illustrating a technique for forming the transform 58 of FIG. 1.

Referring now to FIG. 2, patterns of specified arrays of R, G, B (red, green, and blue) exposure values or other image-forming values, chosen to produce colors, which adequately sample and cover the useful color range of the reflection medium 12 being calibrated, are created by pattern generator 40 and are fed to image-forming apparatus 42. The image-forming apparatus 42 produces one or more test images 46, consisting of approximately 400 test colors, on reflection medium 12. The test images may be created using a variety of methods appropriate for the application. These methods may include, but are not limited to, using an exposing apparatus such as a sensitometer, using the output device of a color imaging apparatus, or directly recording images of test objects from original test objects or reproductions of test objects on intermediary imaging media. The reflection medium is then processed chemically or by other means appropriate for the specific medium to produce the test images. The colorimetric values for each test color of the test images are then determined by a colorimetric measuring device 48. Colorimetric measuring device 48 may utilize, for example, spectrophotometric, spectroradiometric, or colorimetric measurements and colorimetric computational techniques, known to those skilled in the art, for the specified illuminant of the viewing environment for the reflection input medium. If the amount of viewing flare in the specified input viewing is different from that of the reference viewing environment, the computed colorimetric values must be transformed by a viewing-flare transform 50 to the corresponding colorimetric values for the amount of flare specified for the reference viewing environment. This transformation may be performed by adding or subtracting, as appropriate, the difference between the amounts of flare light or by using other techniques known to those skilled in the art. For example, if the colorimetric measurements and computations for the color patches are for 0.0% viewing flare, the input viewing environment is specified to be 1.0% viewing flare, and the reference viewing environment is specified to be 0.0% viewing flare, then flare-adjusted colorimetric values can be determined by computing the results of additively mixing 1.0% of the viewing illuminant with the measured colorimetric values.

If the adaptive white point of the specified input viewing environment is different in chromaticity from that of the reference viewing environment, the transformed colorimetric values must be further transformed by a chromatic adaptation transform 52 to the corresponding colorimetric values for the adaptive white point of the reference viewing environment. This transformation may be performed by using a chromatic adaptation transform, such as a VonKries transformation matrix, or by using other techniques known to those skilled in the art. For example, if the flare-adjusted tristimulus values of the input viewing environment are defined as $X_f Y_f Z_f$, and the corresponding tristimulus values for the reference viewing environment are defined as $X_c Y_c Z_c$ (chromatic-adaptation-corrected), then the transformation is written as:

| $X_c$ | | $X_f$ |
|---|---|---|
| $Y_c$ | = M | * $Y_f$ |
| $Z_c$ | | $Z_f$ | where matrix M is the VonKries transformation matrix consistent with the chromaticities of the adaptive white points of the input and reference viewing environments.

In some cases, the chromaticities of the adaptive white point will correspond to the chromaticities of the viewing illuminant. In other cases, however, observer chromatic adaptation may be incomplete. As a result, the chromaticities that would appear achromatic to the observer may be different than those of the viewing illuminant. The degree of chromatic adaptation will depend on the absolute luminance level of the viewing environment, the particular chromaticity values of the illuminant, and other factors. The determination of the adaptive white point is best done by psychophysical experiments in which the observer, adapted to the viewing environment, identifies a stimulus which appears to be achromatic and which appears to correspond in luminance to a 100% diffuse reflecting object.

The values from chromatic adaptation transform 52 may be further transformed by a colorimetric conversion 54, for example to convert from CIE XYZ units to CIE 1976 L*a*b* units, to form database color encoding values. The database color encoding values represent the corresponding colorimetric values that would be required to match, in the viewing conditions of the reference viewing environment, the appearance of an input image, on the reflection medium calibrated, as that image would appear if viewed in the specified input viewing environment.

Test images 46 are additionally read by reflection scanner 14 which produces image-bearing signals corresponding to each test color. A transform apparatus 56 then creates a transform 58 that relates the image-bearing signal values for the input medium colors to the determined database color encoding values of the corresponding test colors.

Referring again to FIG. 1, transform 58 is subsequently used in workstation 26 to transform input images, scanned from reflection medium 12 using reflection scanner 14, to database color encoding values. Transforms similar to transform 58, appropriate for images on reflection medium 12 but for different input viewing conditions, may be derived according to the methods of this embodiment. Transforms appropriate for images on other reflection media and other types of media designed to be viewed in the surround condition of the reference viewing environment may also be derived according to the methods of this embodiment. Input images so transformed are made compatible with each other, consistent with the image-storage, image-adjustment, image-manipulation, and image-merging objects of the color image encoding mechanism.

Figure 3:
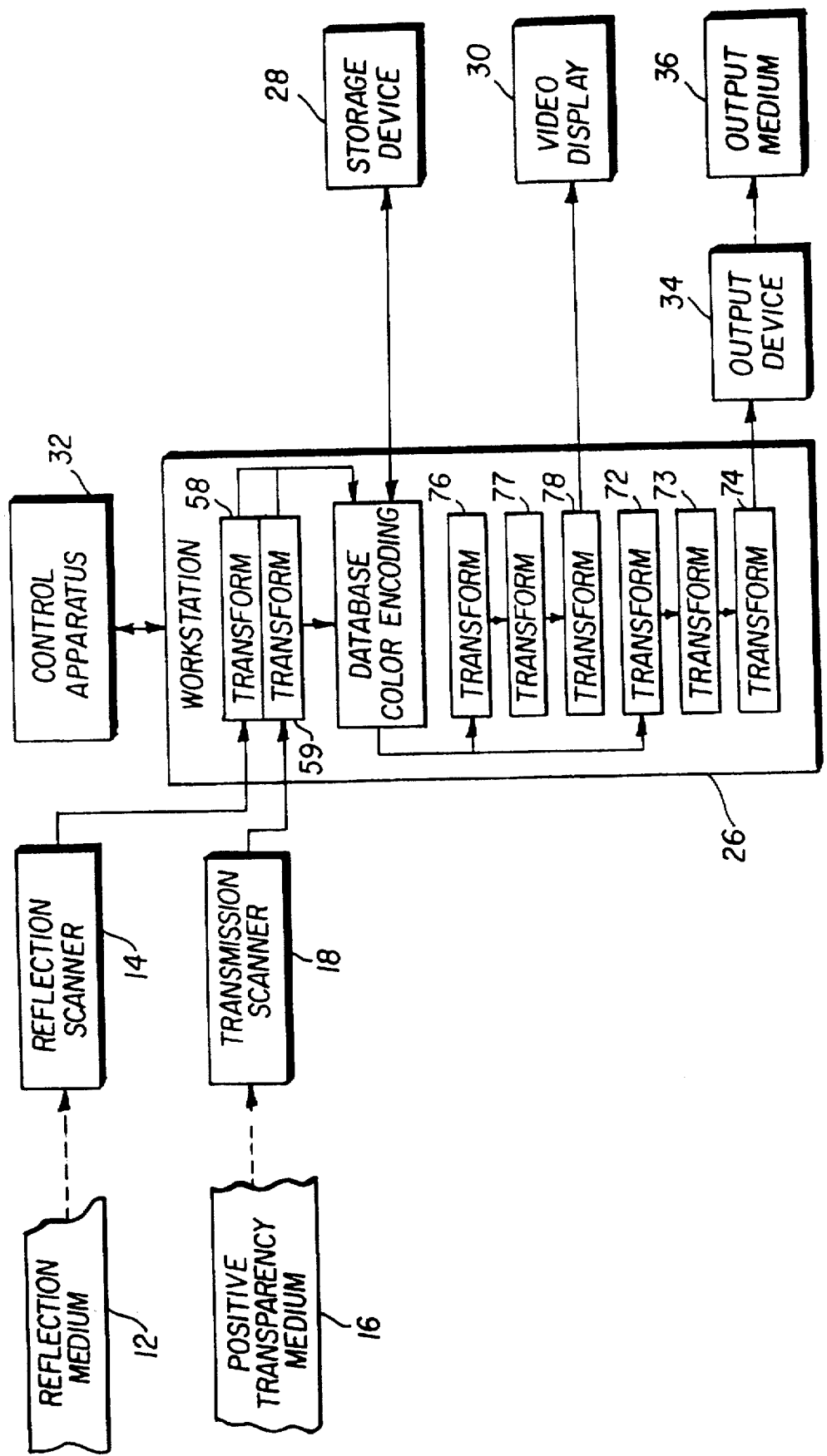
FIG. 3 is a block diagram of another embodiment of the color encoding mechanism described in the above-referenced '060 application.

FIG. 3 diagrammatically illustrates a color image reproduction apparatus in accordance with a second embodiment of the color encoding mechanism described in the '060 application. Again, one or more reflection scanners 14 serve for scanning input images on one or more reflection media 12 and for producing image-bearing signals in digital form for each picture element of the reflection image being scanned. In addition, one or more transmission image scanners 18, serve for scanning input images on one or more positive transparency media 16 and for producing image-bearing signals in digital form for each picture element of the positive transparency image being scanned. The computer-based workstation 26, which receives the image-bearing signals from both types of scanners, transforms the input image-bearing signals into an intermediary image data encoding. The remainder of the blocks function as described in FIG. 1.

In accordance with this embodiment, the objective of the system, which includes achieving compatibility of images obtained from multiple reflection scanners and media and images obtained from multiple transmission scanners and positive transparency media are achieved by converting the image-bearing signals from positive rendered images, for example, those produced by scanning an image from a transparency film with a transmission scanner, to a database encoding representative of the corresponding colorimetric values that would be required to match, in the viewing conditions of the reference viewing environment, the appearance of an input image as that image would appear if viewed in a specified input viewing environment.

The encoding scheme generates a data-set from which transformations are derived to convert image-bearing signals from input transparencies intended for projection in a darkened room, and from other image-receptive media viewed in viewing environments in which the surround differs from that associated with the reference viewing environment, to the database color encoding values.

Figure 4:
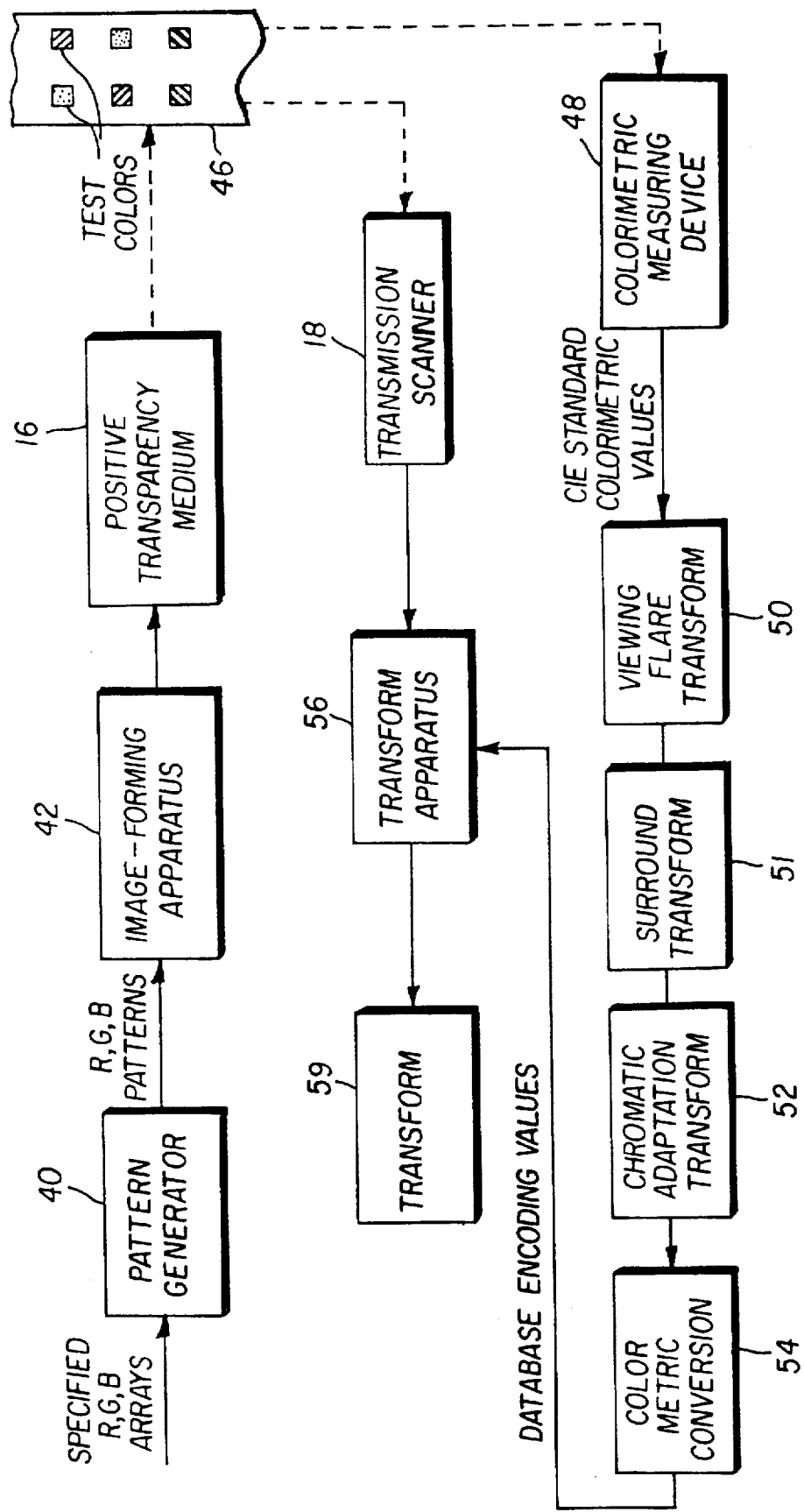
FIG. 4 is a detailed block diagram illustrating a technique for forming the transform 59 of FIG. 3.

Referring to FIG. 4, patterns of specified arrays of R, G, B exposure values or other image-forming values, chosen to produce colors which adequately sample and cover the useful color range of the to be calibrated positive transparency medium 16, are created by the pattern generator 40 and are fed to the image-forming apparatus 42. The image-forming apparatus produces one or more test images 46, consisting of approximately 400 test colors on the positive transparency medium 16. The test images may be created using a variety of methods appropriate for the application. These methods would include, but would not be limited to, using an exposing apparatus such as a sensitometer, using the output device of a color imaging apparatus, or directly recording images of test objects from original test objects or reproductions of test objects on intermediary imaging media. The positive transparency medium is then processed chemically or by other means appropriate for the specific medium to produce the test images 46. The colorimetric values for each test color of the test images are then determined by the colorimetric measuring device 48, for the specified illuminant of the viewing environment for the input medium. If the amount of viewing flare in the specified input viewing environment is different from that of the reference viewing environment, the computed colorimetric values must be transformed by the viewing-flare transform 50 to the corresponding colorimetric values for the amount of flare specified for the reference viewing environment. The transformed colorimetric values are further transformed by a surround-transform 51 in order to account for the difference between the surround of the reference viewing environment and the surround specified for the input viewing environment.

In particular, the surround factor S described below of surround-transform 51 is used to account for a perceptual effect, customarily identified as lateral brightness inhibition, which may be induced by an image's surround and which may alter an observer's perception of image luminance contrast. The value of this surround factor, which is defined to have a value of 1.00 for a normal surround in which the illumination of the image is similar in luminance to the luminance of the surround, is affected by factors such as absolute luminance levels, image size, and other factors. The determination of the value of the surround factor is best done by psychophysical experiments in which the observer, successively adapted to each viewing environment, identifies images which appear to match in luminance contrast.

For example, if the input viewing environment is specified to have a dark surround, as for projected transparencies, and the surround of the reference viewing environment is specified as normal, then the first-transformed colorimetric values are further transformed to account for the perceived lowering of the luminance contrast induced by the dark surround.

In addition, the luminance factors $\beta_d$ and $\beta_n$ described below of surround-transform 51 are used to account for a second perceptual effect, known to those skilled in the art as general brightness adaptation, which causes the observer to discount differences in over-all image brightness. A determination of the luminances of the adaptive white points used below are best done by psychophysical experiments in which the observer, adapted to the viewing environment, identifies a stimulus which appears to be achromatic and which appears to correspond to a 100% diffuse reflecting white object.

One method for transforming a set of tristimulus values, $X_d Y_d Z_d$, for a given picture element of an input image, intended to be viewed in a dark surround, to a set of visually corresponding $X_n Y_n Z_n$ values for an image viewed in a normal-surround reference surround may consist of:

1) Computing a luminance factor $\beta_d$ for the picture element, where $\beta_d$ is equal to $Y_d/Y_{wi}$ and where $Y_{wi}$ is the luminance value for the adaptive white point of the dark-surround input viewing environment, 2) Defining a luminance factor $\beta_n$, where $\beta_n$ is equal to $Y_n/Y_{wr}$ and where $Y_{wr}$ is the luminance value for the adaptive white point of the normal-surround reference viewing environment, 3) Computing $\beta_n$ for the picture element to be equal to $\beta_d{}^S$, where the exponent S is an experimentally determined surround factor of less than 1.00 which corresponds to the factor to which the perceived luminance contrast would be lowered by the dark surround of the input viewing environment, and 4) Computing corresponding tristimulus values $X_n$, $Y_n$, $Z_n$ for the reference viewing environment from the tristimulus values $X_d$, $Y_d$, $Z_d$ of the input viewing environment according to the following equations:

$$Y_n = Y_{wr} * \beta_n$$

$$X_n = X_d * (Y_n/Y_d)$$

$$Z_n = Z_d * (Y_n/Y_d)$$

If the adaptive white point of the specified input viewing environment is different in chromaticity from that of the reference viewing environment, the computed colorimetric values must be further transformed by the chromatic adaptation transform 52 to the corresponding colorimetric values for the adaptive white point of the reference viewing environment.

The values from the chromatic adaptation transform may be further transformed by the colorimetric conversion 54, for example, to convert from CIE XYZ units to CIE 1976 L*a*b* units, to form the database color encoding values. The database color encoding values represent the corresponding colorimetric values that would be required to match, in the viewing conditions of the reference viewing environment, the appearance of an input image, on the calibrated positive transparency medium, as that image would appear if viewed in the specified input viewing environment.

Test images 46 are additionally read by transmission scanner 18 which produces image-bearing signals corresponding to each test color. The transform apparatus 56 then creates transform 59 relating the image-bearing signal values for the input medium colors to the determined database color encoding values of the corresponding test colors.

Referring again to FIG. 3, transform 59 is subsequently used in workstation 26 to transform images on positive transparency medium 16 and scanned on transmission scanner 18 to database color encoding values. All positive transparency input images so transformed are compatible with each other; moreover, they become compatible with dissimilar images, such as those on reflection medium 12, transformed according to the teaching of the first embodiment. Transforms similar to transform 59, appropriate for images on positive transparency medium 16 but for different input viewing conditions, may be derived according to the methods of this embodiment. Transforms appropriate for images on other positive transparency media and other types of media designed to be viewed in a surround condition that differs from that of the reference viewing environment, may also be derived according to the methods of the present embodiment. Input images so transformed are made compatible with each other and with images produced in the first embodiment.

Figure 5:
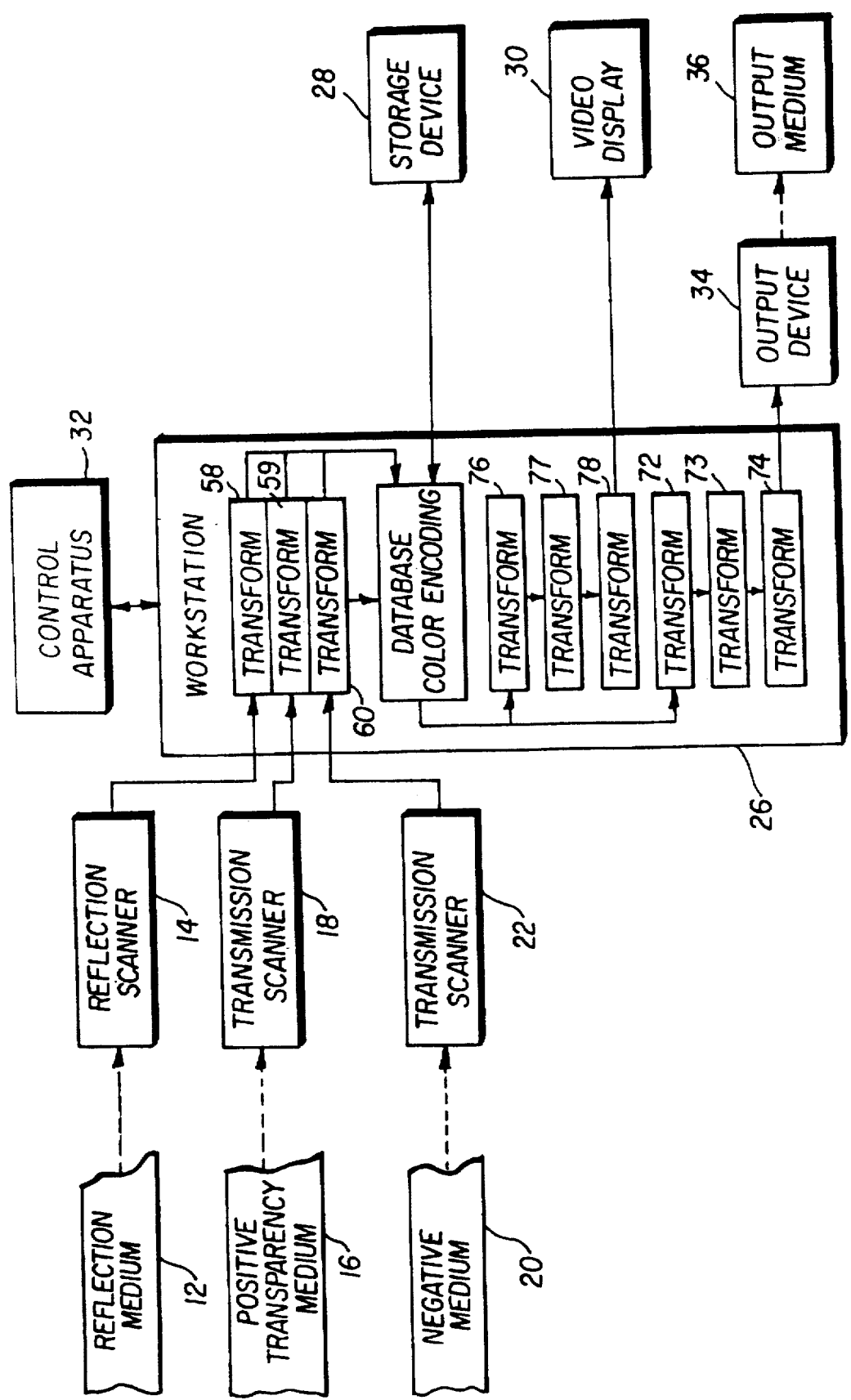
FIG. 5 is a block diagram of another embodiment of the color encoding mechanism described in the above-referenced '060 application.

FIG. 5 diagrammatically illustrates a color image reproduction apparatus in accordance with a third embodiment of the color image encoding mechanism of the '060 application. As shown, one or more reflection scanners 14 scan input images on one or more reflection media 12 and produce image-bearing signals in digital form for each picture element of the reflection image being scanned. One or more transmission scanners 18 scan input images on one or more positive transparency media 16 and produce image-bearing signals in digital form for each picture element of the positive image being scanned. In addition, one or more transmission scanners 22 scan negative input images on one or more negative media 20 and produce image-bearing signals in digital form for each picture element of the negative image being scanned. A computer-based workstation 26, which receives the image-bearing signals from various scanners, transforms the input image-bearing signals into an intermediary image data encoding. The remainder of the components of FIG. 5 correspond to those of FIGS. 1 and 3, described above.

In the third embodiment, to provide compatibility of images obtained from multiple reflection scanners and media, images obtained from multiple transmission scanners and positive transparency media, and images obtained from multiple transmission scanners and negative media the image-bearing signals from reflection and transmission positive rendered images are converted to database color encoding representative of the corresponding colorimetric values that would be required to match, in the viewing conditions of the reference viewing environment, the appearance of each positive input image as that image would appear if viewed in a specified input viewing environment and by converting image-bearing signals from negative media and other unrendered imaging media to rendered (i.e., intended for direct viewing) colorimetric values consistent with the viewing environment of database color encoding.

Figure 6:
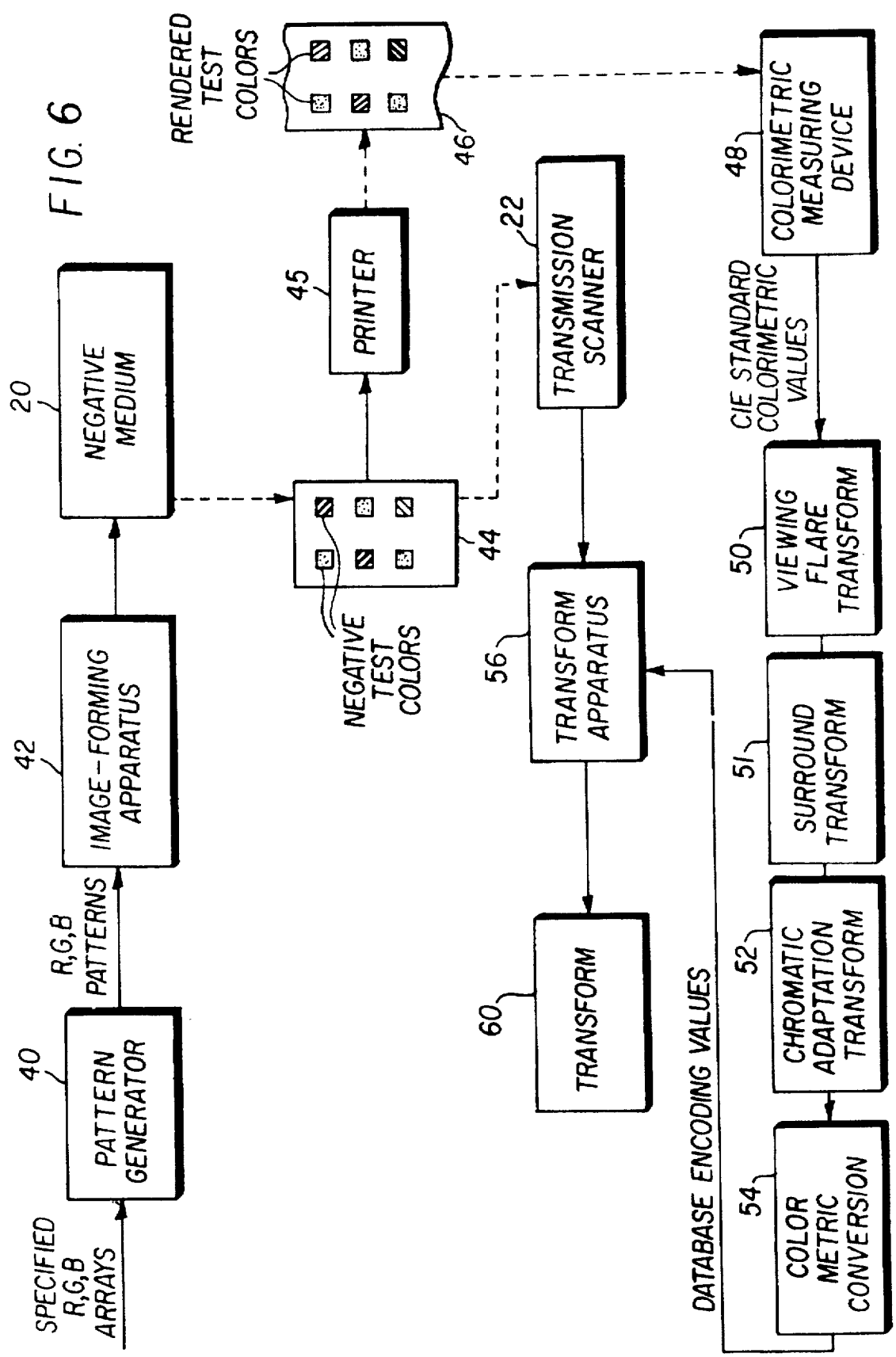
FIG. 6 is a detailed block diagram illustrating a technique for forming the transform 60 of FIG. 5.

Referring now to FIG. 6, patterns of specified arrays of R, G, B exposure values or other image-forming values, chosen to adequately sample and cover the useful input range of the negative medium 20 being calibrated, are created by pattern generator 40 and are fed to image-forming apparatus 42. The image-forming apparatus produces test images 44, consisting of approximately 400 test colors, on one or more negative medium 20. Negative test images may be created using a variety of methods appropriate for the application. These methods include, but are not limited to, using an exposing apparatus such as a sensitometer, using the output device of a color imaging apparatus, or directly recording images of test objects from original test objects or reproductions of test objects on intermediary imaging media. The negative medium is then processed chemically, if necessary. The test images 44 of the negative input medium are then printed, using printer 45 and appropriate printing techniques, onto an appropriate complimentary rendering medium, such as a photographic paper, to form rendered test images 46. The colorimetric values for each test color of the rendered test images are then determined by the colorimetric measuring device 48, for the specified illuminant of the viewing environment for the rendered images of the input negative. In cases where a computational model of the complementary rendering medium is available, the colorimetry of the rendered test colors can be determined without requiring that actual rendered test images be made and measured.

If the amount of viewing flare in the specified viewing environment for the rendered images is different from that of the reference viewing environment, the computed colorimetric values must be transformed by viewing-flare transform 50, using the methods previously described, to the corresponding colorimetric values for the amount of flare specified for the reference viewing environment. If the surround specified for the viewing environment of the rendered images differs from the surround of the reference viewing environment, the transformed colorimetric values are further transformed by surround-transform 51, using the methods previously described. If the adaptive white point of the viewing environment for the rendered images is different in chromaticity from that of the reference viewing environment, the computed colorimetric values are further transformed by chromatic adaptation transform 52, using the methods previously described, to the corresponding colorimetric values for the adaptive white point of the reference viewing environment. The values from the chromatic adaptation transform may be further transformed by colorimetric conversion 54, for example to convert from CIE XYZ units to CIE 1976 L*a*b* units, to form Database Color Encoding values. The database color encoding values represent the corresponding colorimetric values that would be required to match, in the viewing conditions of the reference viewing environment, the appearance of an input image, printed or otherwise rendered from the negative medium calibrated, as that rendered image would appear if viewed in a specified input viewing environment.

The negative medium test colors are additionally read by transmission scanner 22 which produces image-bearing signals corresponding to each negative test color. Transform apparatus 56 creates transform 60 that relates the image-bearing signal values for the input negative colors to the determined database color encoding values of the corresponding rendered test colors.

Referring again to FIG. 5, transform 60 is subsequently used in workstation 26 to transform images on negative medium 20 and scanned on transmission scanner 22 to database color encoding values. Negative transmission input images so transformed are compatible with each other; moreover, they are made compatible with images such as those on reflection medium 12, which have been transformed according to the teachings of the first embodiment, and they are also made compatible with images such as those on positive transparency medium 16, transformed according to the teachings of the second embodiment. In accordance with this embodiment, transforms similar to transform 60, appropriate for images on negative medium 20, but for different rendering media and/or rendered-input-image viewing conditions, may be derived. Transforms appropriate for images on other negative transmission media, other types of unrendered media, and/or different rendered input image viewing environments may also be derived according to this embodiment. Input images so transformed are made compatible with each other and with images produced in the first and second embodiments.

Figure 7:
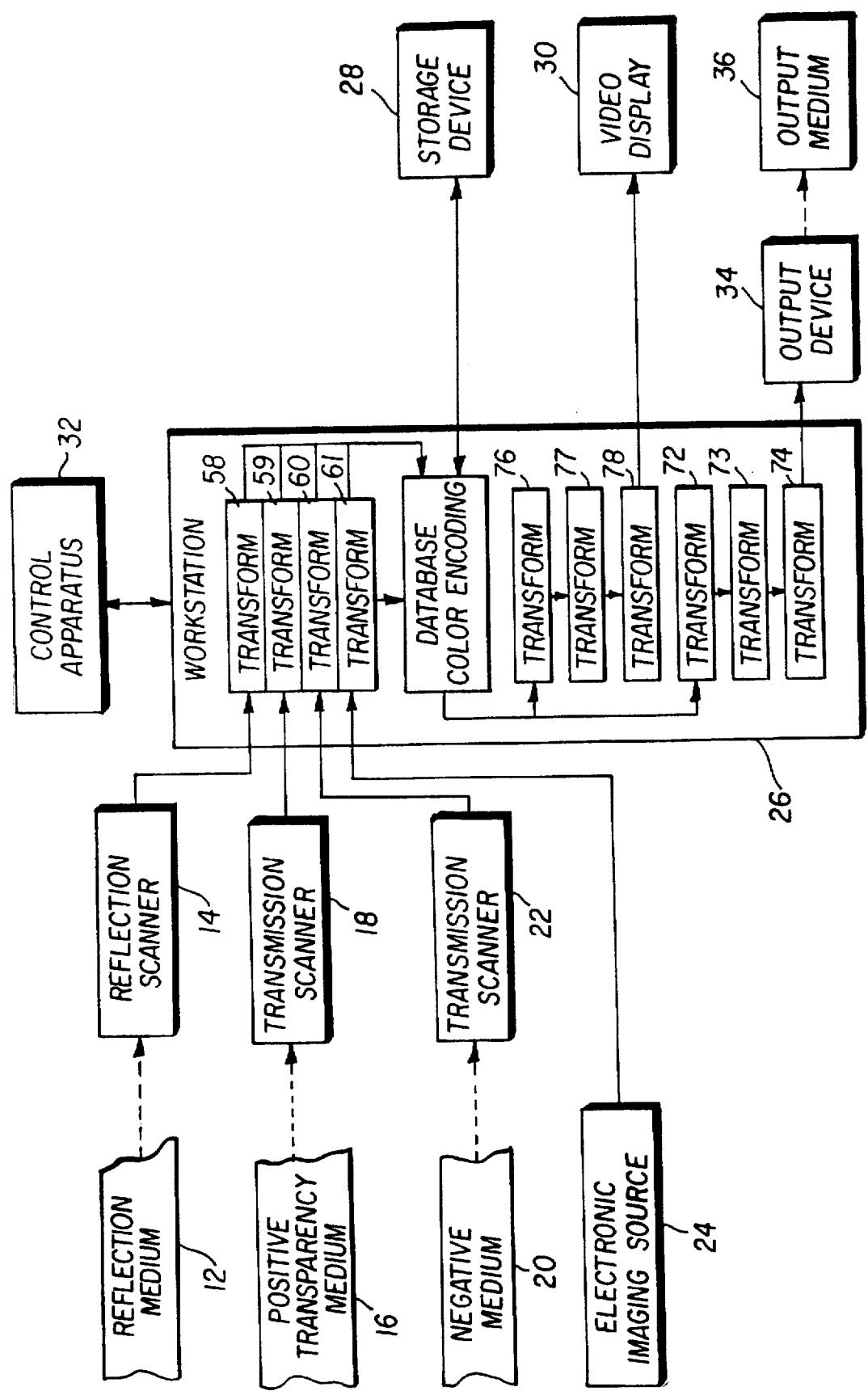
FIG. 7 is a block diagram of another embodiment of the color encoding mechanism described in the above-referenced '060 application.

FIG. 7 diagrammatically illustrates another embodiment of the color encoding mechanism described in the above-referenced '060 application. This embodiment provides a method and means for generating a data-set from which transformations are derived to convert image-bearing signals corresponding to unrendered input images, such as signals or data obtained from some types of electronic imaging source to database color encoding values.

One or more reflection scanners 14 scan input images captured on one or more reflection media 12 and produce image-bearing signals in digital form for each picture element of the reflection image being scanned. One or more transmission scanners 18 scan input images on one or more positive transparency media 16 and produce image-bearing signals in digital form for each picture element of the positive image being scanned. One or more transmission scanners 22 scan input images on one or more negative media 20 and produce image-bearing signals in digital form for each picture element of the negative image being scanned. In addition, one or more electronic imaging sources 24, such as a charge-coupled-device (CCD) based video camera or an electronic image storage device/medium, produce image-bearing signals in digital form for each picture element of a captured or stored image. The remainder of the illustrated system corresponds to that described above with reference to FIGS. 1, 3 and 5.

Objectives of this fourth embodiment include achieving compatibility of: images obtained from multiple reflection scanners and media, images obtained from multiple transmission scanners and positive transparency media, images obtained from multiple transmission scanners and negative media, and images obtained from various electronic imaging sources. These objectives are achieved by converting the image-bearing signals from positive reflection or transmission images to a database encoding corresponding to the colorimetric values that would be required to match, in the viewing conditions of the reference viewing environment, the appearance of the positive input image as that image would appear if viewed in a specified input viewing environment, and by converting image-bearing signals from negative media and from electronic imaging sources to rendered colorimetric values consistent with the viewing environment of database color encoding.

Figure 8:
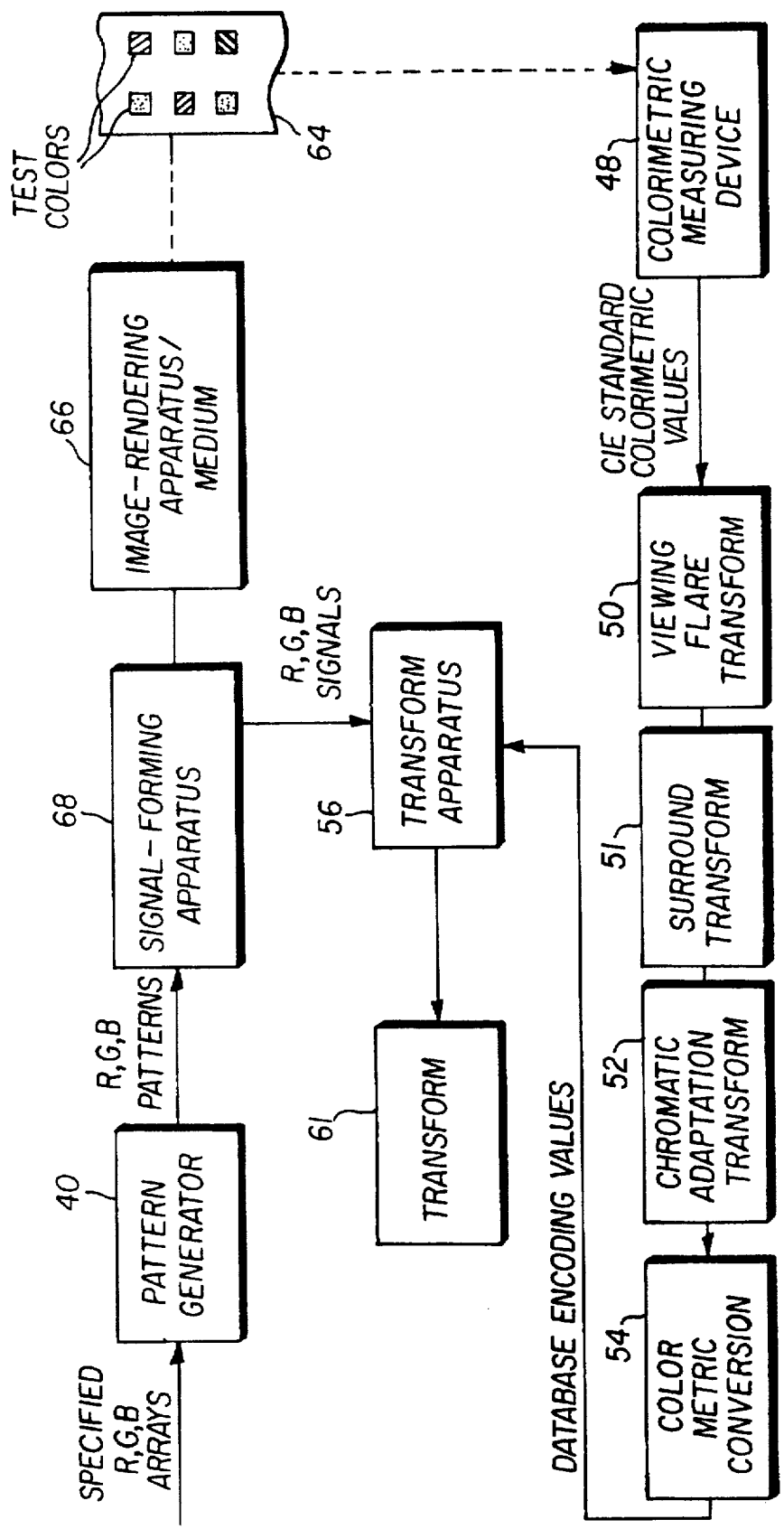
FIG. 8 is a detailed block diagram illustrating a technique for forming the transform 61 of FIG. 7.

Referring to FIG. 8, patterns of specified arrays of R, G, B or other image-forming values, chosen to adequately sample and cover the useful range of values representative of those produced by the electronic imaging source being calibrated, are created by pattern generator 40 and are provided to signal-forming apparatus 68. The signal-forming apparatus produces signals which are provided to image-rendering apparatus/medium 66 to produce one or more test images 64, consisting of approximately 400 test colors. The image-rendering apparatus/medium 66 may be a thermal printer or other device to which the electronic image data might normally be sent. The test images 64 are processed chemically or by other means appropriate for the specific medium to produce the test colors. The image-rendering apparatus/medium 66 could also be an electronic display device, such as a video monitor. The colorimetric values for each test color of the rendered test images are then determined by the colorimetric measuring device 48, for the specified illuminant of the viewing environment for the input medium. Where a computational model of the image-rendering apparatus/medium is available, colorimetry of the rendered test colors can be determined without requiring that actual rendered images be made and measured.

If the amount of viewing flare of the specified viewing environment for the images rendered from the input electronic imaging source is different from that of the reference viewing environment, the computed colorimetric values are transformed by viewing-flare transform 50 to the corresponding colorimetric values for the amount of flare specified for the reference viewing environment, using the previously described methods. If the surround specified for the viewing environment of the images rendered from the input electronic imaging source differs from the surround of the reference viewing environment, the transformed colorimetric values are further transformed by surround-transform 51, using the methods previously described.

Where the adaptive white point of the specified viewing environment of the images rendered from the input electronic imaging source is different in chromaticity from that of the reference viewing environment, the computed colorimetric values are further transformed by chromatic adaptation transform 52 to the corresponding colorimetric values for the adaptive white point of the reference viewing environment, using the previously described methods or other techniques known to those skilled in the art. The values from the chromatic adaptation transform may be further transformed by colorimetric conversion 54, for example to convert from CIE XYZ units to CIE 1976 $L^*a^*b^*$ units, to form database color encoding values. The database color encoding values represent the corresponding colorimetric values that would be required to match, in the viewing conditions of the reference viewing environment, the appearance of an input image, rendered from the electronic imaging source being calibrated, as that image would appear if viewed in the specified rendered-image viewing environment. Image-bearing signals from signal-forming apparatus 68 are additionally provided to transform apparatus 56 which creates transform 61 that relates image-bearing signal values, corresponding to those produced by the electronic imaging source being calibrated, to the determined database color encoding values of the corresponding rendered test colors.

Referring again to FIG. 7, transform 61 is subsequently used in workstation 26 to transform images from electronic imaging source 24 to database color encoding values. Images from electronic imaging sources so transformed are compatible with each other; moreover, they are made compatible with images such as those on reflection medium 12, which have been transformed according to the teachings of the first embodiment, they are made compatible with images such as those on positive transparency medium 16 transformed according to the teaching of the second embodiment, and they are made compatible with images such as those on negative medium 20, transformed according to the teaching of the third embodiment. Transforms similar to transform 61, appropriate for images from electronic imaging source 24, but for different rendering devices/media and/or rendered-input-image viewing conditions, may be derived according to the methods of this embodiment. Transforms appropriate for images from other electronic imaging sources and/or other input image viewing environments may also be derived according to the methods of this embodiment. Input images so transformed are made compatible with each other and with images produced in the first, second, and third embodiments.

Each image on each type of input medium or source calibrated according to these four embodiments will yield database color encoding values representative of the corresponding colorimetric values that would be required to match, in the viewing conditions of the reference viewing environment associated with the database color encoding, the appearance of a rendered input image, as that image would appear if viewed in a specified input viewing environment. In many cases, uncalibrated inputs may also be used with transformations derived for similar types of inputs, and the results would generally be satisfactory.

Returning to FIG. 7, when the output values or signals are provided to appropriately calibrated image-writing or image-forming devices, such as output device 34 or video display 30, images will be formed whose appearance will match, for any specified output viewing environment, the appearance of the image as described by the colorimetric values and reference viewing environment of the database color encoding. The specified output environment, which may differ from the reference viewing environment of the database, may correspond to an actual output viewing environment to be used or to the viewing environment generally associated with the type of output imaging device/medium. As with the specified input viewing environment, the specified output viewing environment must be defined in terms of its surround, adaptive white point, viewing flare, and illumination spectral power distribution. The color image encoding mechanism of the '060 application provides a mechanism for generating a data set from which transformations may be derived to convert database color encoding values to the CIE standard colorimetric data values required to match, in a specified output viewing environment, the appearance corresponding to the database colorimetric values and the database reference viewing environment.

Figure 9:
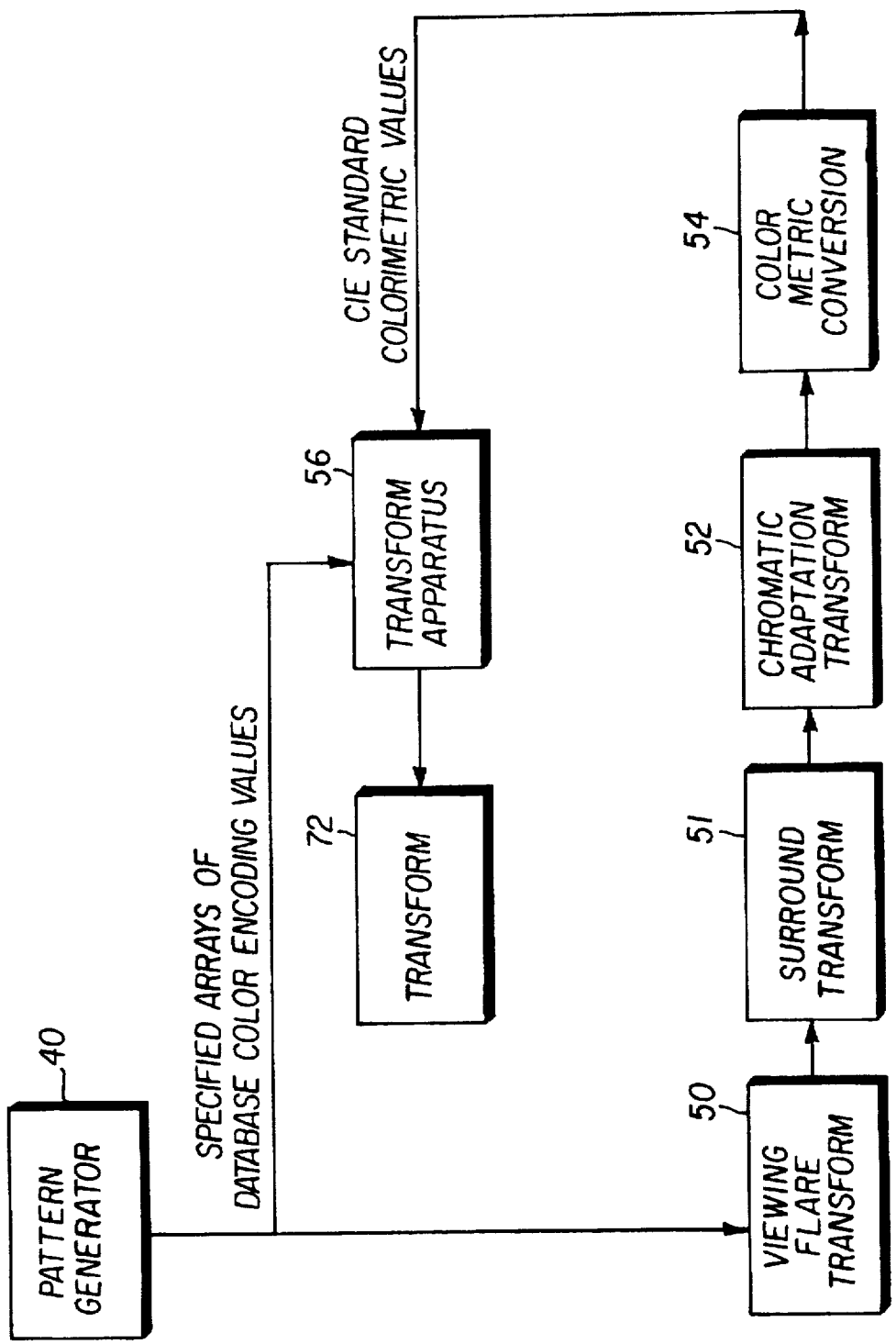
FIG. 9 is a detailed block diagram illustrating a technique for forming the transform 72 of FIG. 7.

Referring to FIG. 9, specified arrays of database color encoding values are provided by pattern generator 40 to transform apparatus 56 and to viewing-flare transform 50. If the amount of viewing flare of the specified output viewing environment is different from that of the reference viewing environment, the specified database color encoding values are transformed by viewing-flare transform 50 to the corresponding colorimetric values for the amount of flare specified for the output viewing environment, using the previously described methods or other techniques known to those skilled in the art. If the surround specified for the output viewing environment differs from the surround of the reference viewing environment, the transformed colorimetric values are further transformed by surround-transform 51 to the corresponding colorimetric values for the surround of the output viewing environment, using the methods previously described or other techniques known to those skilled in the art.

If the adaptive white point of the specified output viewing is different in chromaticity from that of the reference viewing environment, the values from surround-transform 51 are further transformed by chromatic adaptation transform 52 to the corresponding colorimetric values for the adaptive white point of the output viewing environment, using the previously described methods or other techniques known to those skilled in the art. The transformed values represent the corresponding CIE standard colorimetric values that would be required to match, in the viewing conditions of the output viewing environment, the appearance of an image as that image would appear if viewed in the reference viewing environment. The values from chromatic adaptation transform 52 may be further transformed by colorimetric conversion 54 to the particular CIE standard colorimetric units to be used for the calibration of the particular output device/medium. Transform apparatus 56 then creates transform 72 relating the database color encoding values to the CIE standard color values required to match, in the specified output viewing environment, the appearance corresponding to the database colorimetric values and the database viewing environment. Likewise transform 76 may be derived for video display 30 in a similar fashion. The color image encoding mechanism of the '060 application is operative to generate a calibration data set from which transformations may be derived to convert CIE standard colorimetric data values to output device drive values required to produce the colorimetric values for any of a plurality of image-forming media and/or devices.

Figure 10:
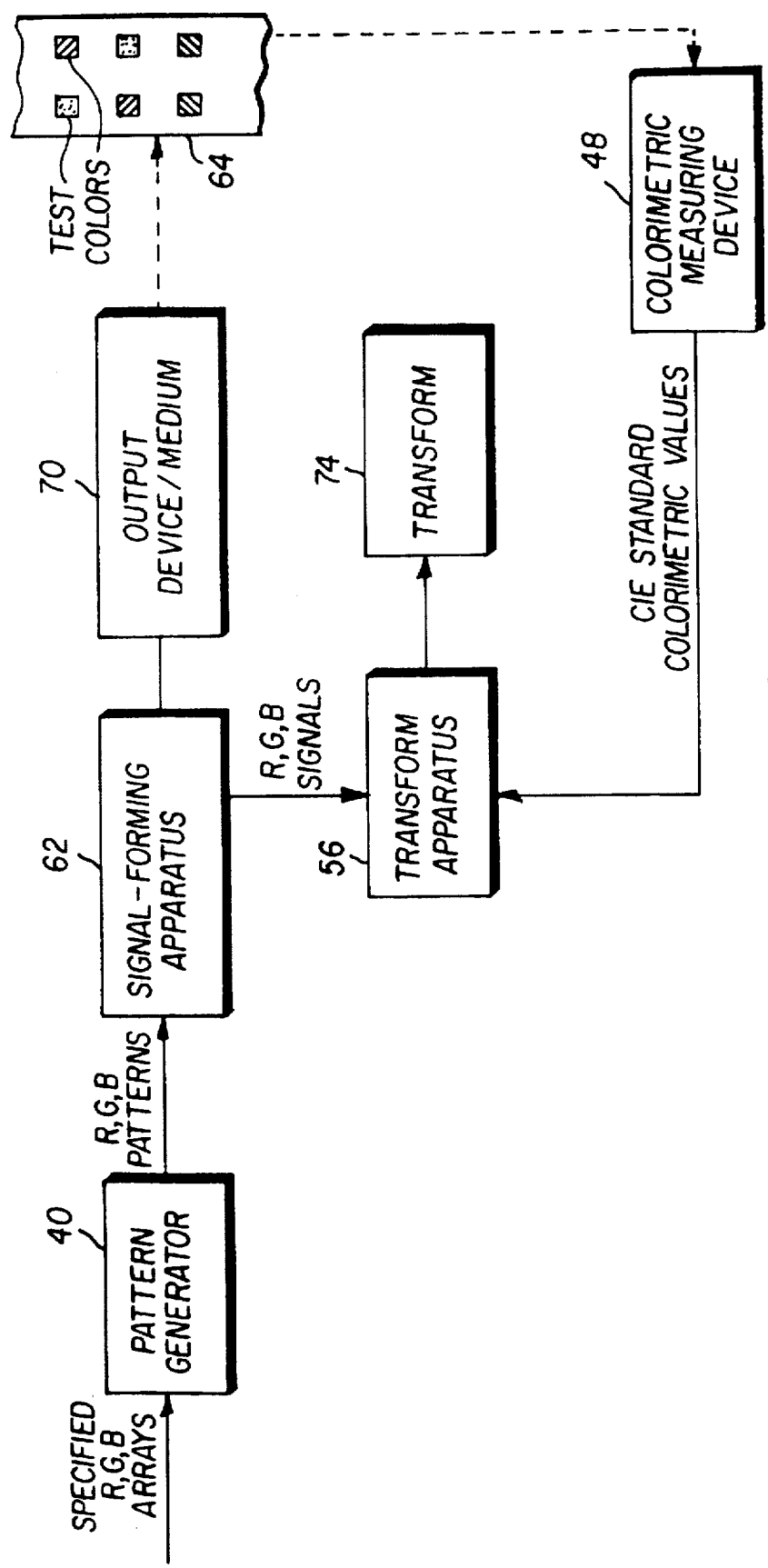
FIG. 10 is a detailed block diagram illustrating a technique for forming the transform 74 of FIG. 7.

Referring to FIG. 10, specified arrays of R, G, B or other output image-forming values, chosen to adequately sample and cover the useful range of drive values for the output device/medium being calibrated, are created by pattern generator 40 and are provided to signal-forming apparatus 62. The signal-forming apparatus produces signals which are provided to an output image-forming device/medium 70 to produce one or more test images 64, consisting of approximately 400 test colors. The output imaging medium is processed chemically or by other means appropriate for the specific medium to produce output test images. Output image-forming device/medium 70 could also be an electronic display device, such as a video monitor. CIE standard colorimetric values for each test color of the output test images are then determined by the colorimetric measuring device 48, for the specified illuminant of the viewing environment for the output device/medium. Transform apparatus 56 is then used to develop transform 74, which is used to transform colorimetric values to the device drive values which would produce image areas with those colorimetric values on the output device/medium. Likewise transform 78 may be derived for video display 30 in a similar fashion.

Referring again to FIG. 7, transforms 72 and 74 are used in combination in workstation 26 to provide the output device drive values required to produce colorimetric values, on a specified output device, such as output device 34, and medium, such as output medium 36, and for a specified output viewing environment, which will produce a visual match corresponding to the colorimetric values specified in the reference viewing environment of the database color encoding. In some cases, the desired colorimetric values may correspond to colors that are outside of the gamut of colors that can actually be produced by the specified output device/medium. In such cases, the out-of-gamut colorimetric values may be transformed by transform 73 into in-gamut colorimetric values using any of a number of gamut-mapping techniques known to those skilled in the art. In some applications, it may be operationally convenient to combine the functions of transforms 72, 73, and 74 into a single transform.

Transforms 76 and 78 are also used to provide output drive values for video display 30. Again, in some cases, the desired colorimetric values may correspond to colors that are outside of the gamut of colors that can actually be produced by the specified video display. In such cases, the out-of-gamut colorimetric values may be transformed by transform 77 into in-gamut colorimetric values. In addition, in cases where video display 30 is used to preview the appearance of images to be produced on another output device/medium, transform 77 may include additional gamut-mapping consistent with the gamut limitations of the particular output device/medium. As will be described below, in accordance with the present invention, which employs the transform compositing mechanism of the '911 Patent, the functions of transforms 76, 77, and 78 may be readily combined into a single transform.

Figure 11:
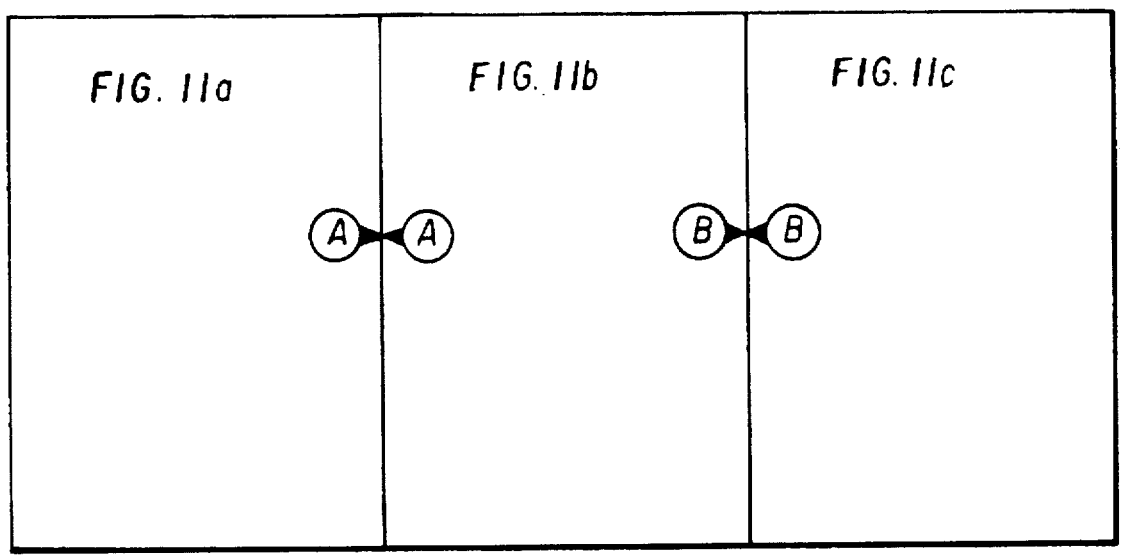
FIG. 11 is a map illustrating relationship among FIGS. 11a, 11b, and 11c.
Figure 11A:
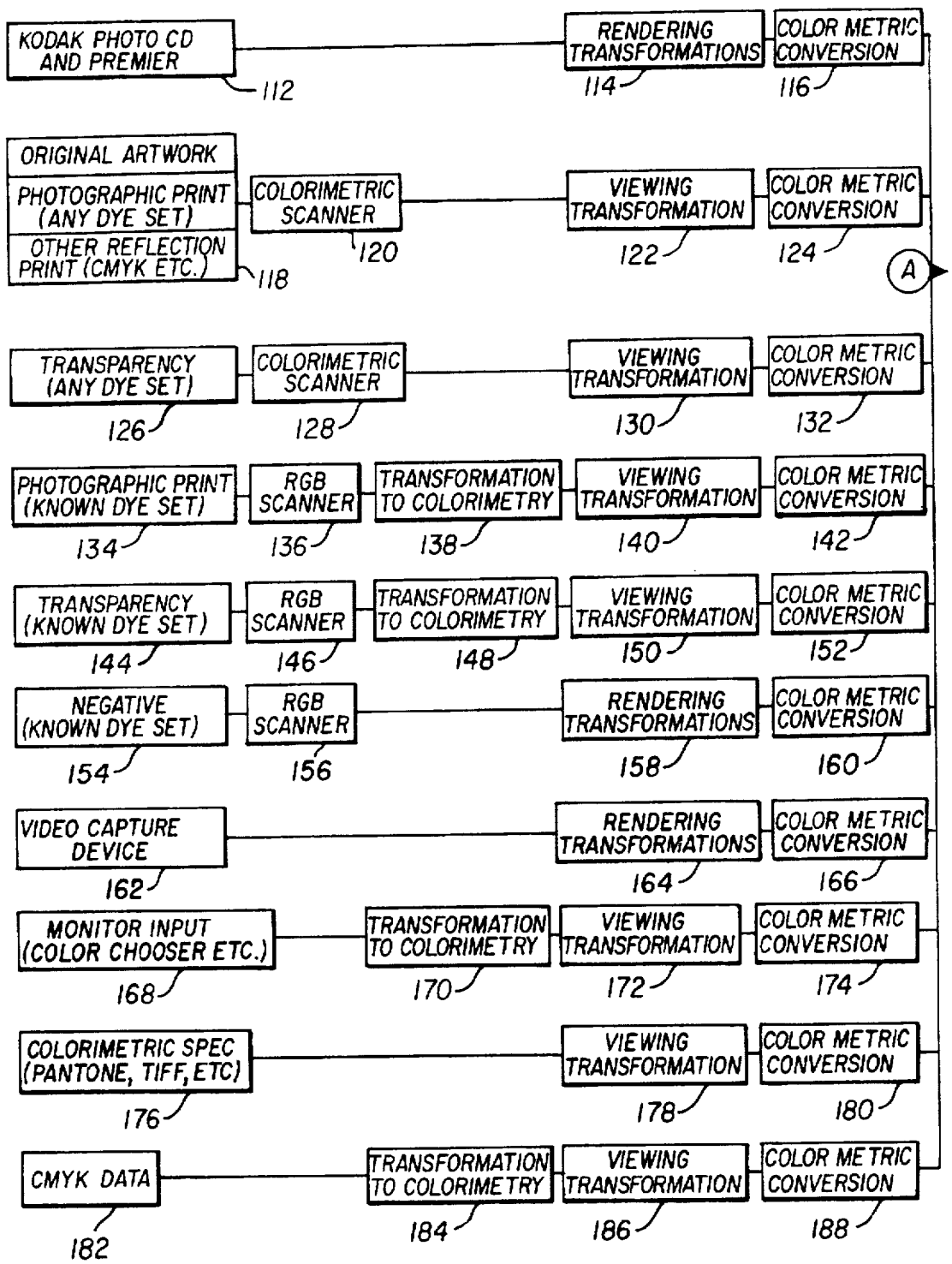
FIGS. 11a, 11b, and 11c are block diagrams of a color reproduction processing system in accordance with an embodiment of the encoding mechanism described in the above-referenced '060 application.
Figure 11B:
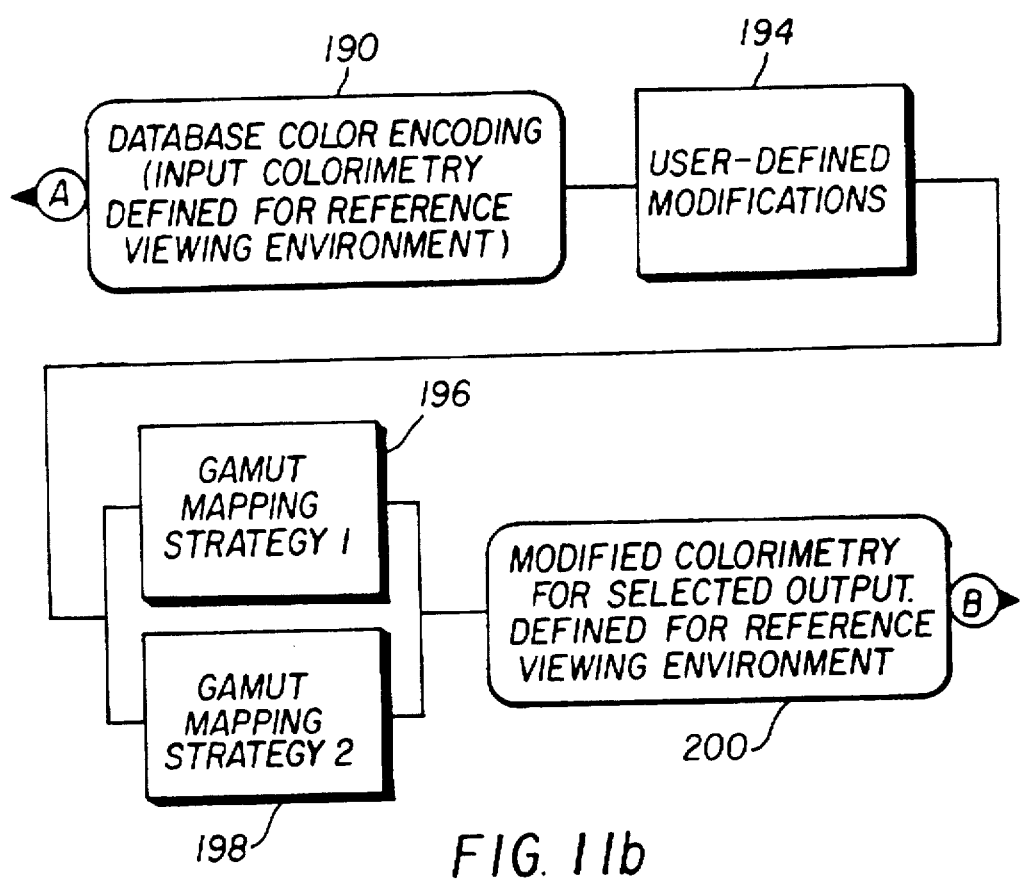
Figure 11C:
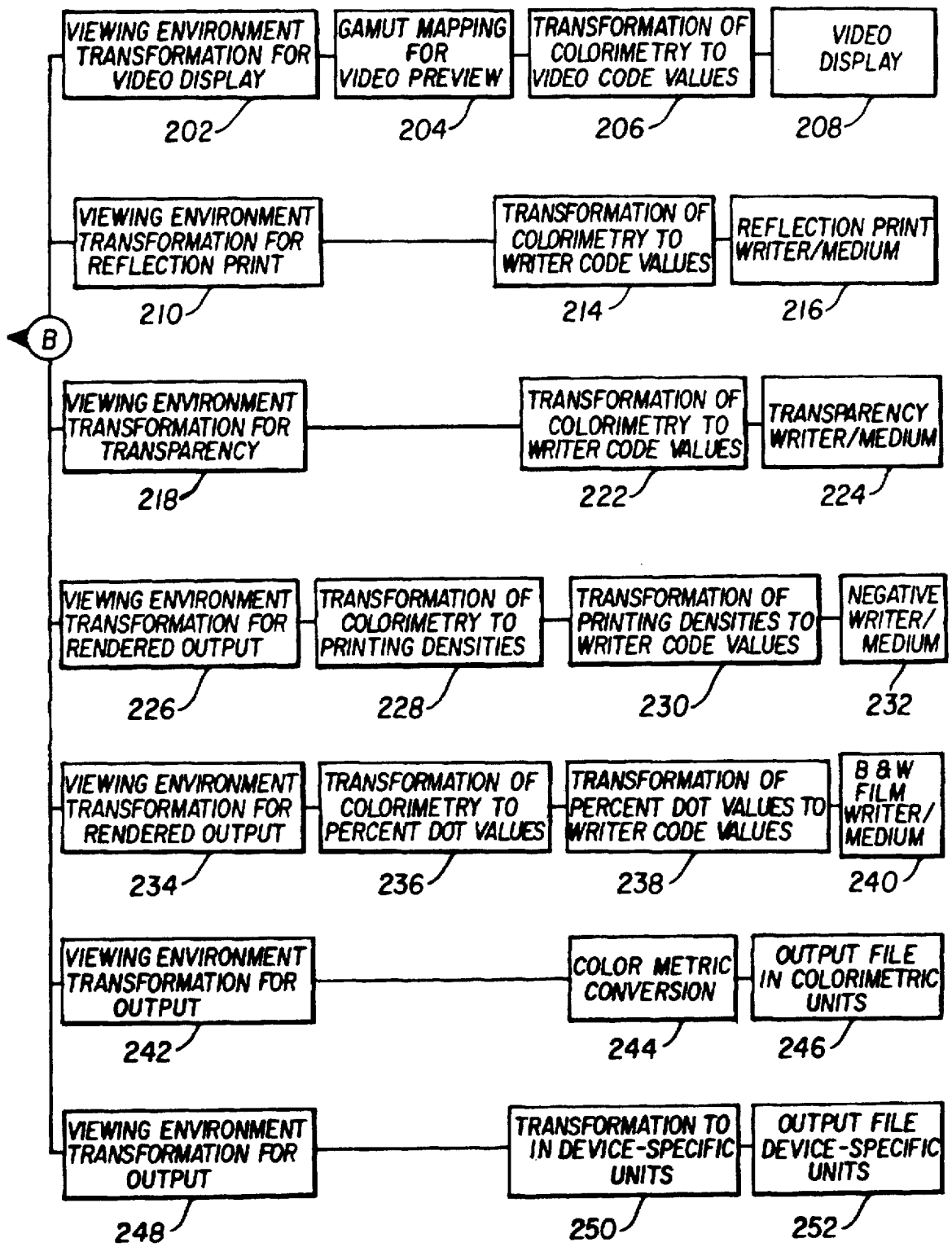

Referring now to the image processing flow diagram of FIG. 11, and associated Figures 11a, 11b, and 11c, a color image reproduction system in accordance with a fifth embodiment of the invention described in the '060 application is shown. In this embodiment, the mechanisms of the previous embodiments are combined with additional related techniques to form a comprehensive color-imaging and color-management system.

More particularly, Figure 11a shows a plurality of input image types together with the image-processing operations required to convert each input image into a reference database color encoding. Unrendered images from electronic image sources 112, such as a KODAK Photo CD System and a KODAK Premier Image Enhancement System, are first rendered, in order to be compatible with the definition of the reference database color encoding. This is accomplished by user-selected rendering options provided by the rendering transformations 114, derived according to the techniques of the fourth embodiment of the color image encoding mechanisms, described above. The rendering options may be general, such as "reflection print", or "projectable transparency" or they may be more specific, referring to a specific rendering device and/or medium. The rendering options may also include an idealized computational rendering that would produce images that are compatible with other database images while retaining the full dynamic range and color gamut of these input sources. A "no rendering" option may also be included. This option could be used in certain cases, such as for merging two Photo CD images to form a composite image that could then be written to a Photo CD-compatible file. The output from the rendering transformations 114 is expressed in terms of the reference viewing environment. Any required metric conversion, i.e., a conversion to the colorimetric units of the database color encoding, can then be performed by colorimetric conversion 116.

Original artwork (such as paintings, drawings, etc.), and photographic and other reflection prints 118 already exist as rendered images. The colorimetry for such images are measured by calibrated reflection colorimetric scanner 120. A colorimetric scanner is defined here to mean that the actual physical spectral responsivities of the scanner correspond to any given set of CIE color-matching functions. For an input material used in a viewing environment that is different in viewing flare or illuminant chromaticities from the reference viewing environment, the corresponding colorimetry for the reference viewing environment must be determined. This is accomplished in viewing transformation 122 according to the techniques described in the first embodiment of the encoding mechanism described above. The output from the viewing transformation 122 may be in terms of any colorimetric units, as any required metric conversion can be performed by colorimetric conversion 124.

Photographic and other transparencies 126, with any imaging dye set, are also rendered images. The colorimetry for such images can be measured by calibrated transmission colorimetric scanner 128. Again, a colorimetric scanner is defined here to mean that the actual physical spectral responsivities of the scanner correspond to any given set of CIE color-matching functions. For a transparency material designed for use in a viewing environment, such as darkened room projection, that is different from the reference viewing environment, the corresponding colorimetry for the reference viewing environment must be determined. This is accomplished in viewing transformation 130, which also corrects for differences in input and reference viewing flare and adaptive white point, according to the techniques described in the second embodiment of the color image encoding mechanism. The output from transform 130 may be in terms of any colorimetric units, as any required metric conversion can be performed by colorimetric conversion 132.

Photographic and other reflection prints 134 of known imaging dye sets can be measured by a calibrated reflection RGB Scanner 136. The RGB output of the scanner can then be converted to colorimetry by Transform to colorimetry 138 using the techniques of the first preferred embodiment of the color image encoding mechanism, described above. Each scanner with different RGB responsivities and each product with a different imaging dye set would require a different transform. For an input material used in a viewing environment that is different in viewing flare or illuminant chromaticities from the reference viewing environment, the corresponding colorimetry for the reference viewing environment must be determined. This is accomplished in viewing transformation 140 according to the techniques described in the first embodiment. The output from transform 140 may be in terms of any colorimetric units, as any required metric conversion can be performed by colorimetric conversion 142.

Photographic and other transparencies 144 of known imaging dye sets can be measured by a calibrated transmission RGB Scanner 146. The RGB output of the scanner can then be converted to colorimetry by Transform to colorimetry 148 using the techniques of the second embodiment. Each scanner with different RGB responsivities and each product with a different imaging dye set would require a different transform. For a transparency material designed for use in a viewing environment that is different from the reference viewing environment (such as darkened-room projection), the corresponding colorimetry for the reference viewing environment must be determined. This is accomplished in viewing transformation 150, which also corrects for differences in input and reference viewing flare and adaptive white point, using the techniques of the second embodiment. The output from the viewing transformation 150 may be in terms of any colorimetric units, as any required metric conversion can be performed by colorimetric conversion 152.

Photographic and other negatives 154 of known imaging dye sets can be measured by a calibrated transmission RGB Scanner 156. Negatives must be rendered in order to be compatible with the reference database color encoding. This is accomplished by user-selected rendering options provided by the Rendering Transformations 158 using the techniques of the above-described third embodiment. Each scanner with different RGB responsivities and each product with a different imaging dye set would require a different set of transforms. The output from the selected rendering transform 158 may be in terms of any colorimetric units, as any required metric conversion can be performed by colorimetric conversion 160.

Video signals from a video capture device 162, such as a video camera, correspond to unrendered images that must be rendered in order to be compatible with the reference encoding. This is accomplished by the user-selected rendering options provided by the rendering transformations 164 using the techniques of the previously described fourth embodiment of the encoding mechanism. The output from the selected rendering transform 164 may be in terms of any colorimetric units, as any required metric conversion can be performed by colorimetric conversion 166.

RGB code values or drive values corresponding to an image that appears on a device such as video monitor 168 may be entered directly to the system. These code values carry an implied rendering, the colorimetry for which can be determined by transform to colorimetry 170 which contains a computational model of the device relating code or drive values to reproduced colorimetry which may be derived using the colorimetric device/medium calibration techniques previously described. Viewing Transformation 172 incorporates chromatic adaptation transforms, surround transforms, flare corrections as required to account for any differences between the actual viewing conditions for the device and those of the reference environment using the techniques described in the second embodiment. The output from viewing transformation 172 may be in terms of any colorimetric units, as any required metric conversion can be performed by colorimetric conversion 174.

Colorimetrically-specified values 176, such as those that may be specified for a background, bar-chart, product logo, text color, etc., may be entered directly to the color imaging system of the present embodiment. Entered colorimetric values may also correspond to image files previously written by this system or to any other colorimetrically-specified image files. Viewing transformation 178 incorporates chromatic adaptation transforms, surround transforms, and flare corrections as required to account for any differences between the viewing conditions corresponding to the specified colorimetry and those of the reference environment using the techniques described in the second embodiment.

The entered and transformed values may be in terms of any colorimetric units, such as CIE XYZ, CIELAB, Munsell, Pantone, etc., as any required metric conversion can be performed by colorimetric conversion 180.

CMYK (cyan, magenta, yellow, black) reflection data 182 for defined imaging colorant sets can also be entered into the system. The CMYK data are converted to colorimetry by transform to colorimetry 184, which may be derived using techniques, such as the Neugebauer equations, known to those skilled in the graphic arts. Each different imaging dye set would require a different transform. For input data corresponding to a viewing environment that is different in viewing flare or illuminant chromaticities from the reference viewing environment, the corresponding colorimetry for the reference viewing environment must be determined. This is accomplished in viewing transformation 186 according to the techniques described in the first embodiment of the encoding mechanism. The output from the viewing transformation 186 may be in any colorimetric units, as any required metric conversion can be performed by colorimetric conversion 188.

As diagrammatically illustrated in FIG. 11b, by the use of these techniques, all input images and data are converted to a uniquely defined database color encoding 190. All input images that were already rendered when they came into the system have been encoded in a way that retains their original rendering and which encodes that rendering in colorimetric terms defined as that required to produce, in the reference viewing environment, the color appearance of the image as it would have appeared had it been viewed in its specified input viewing environment. All images that were not already rendered when they came into the system have been rendered by user-defined rendering transforms and are encoded in a way that retains the appearance of that selected rendering. The image database color encoding 190 retains the appearance of the rendered images, and the common reference viewing environment encoding allows for the intermixing of partial images and for the storage and exchange of images to-and-from disparate devices and media without requiring a knowledge of the original source of the image.

Images so encoded can be modified by user-defined modifications 194. These modifications, which may be provided in a computer application program, might include color and tone scale modifications, special effects, etc. These image modifications may also be applied anywhere along the system data paths preceding the database color encoding 190. For many forms of images, these modifications might be applied immediately following the ColoriMetric Conversions. For certain modifications of other types of images, such as color and density corrections to some forms of unrendered images, it is advantageous to modify the image data before the rendering transformations (114, 158 and 164) are applied.

Images can be further modified using any of a plurality of gamut mapping strategies, indicated by 196 and 198. The specific gamut mapping transforms corresponding to these strategies would generally be dependent on the gamut capabilities and limitations of a selected output device/medium/ viewing environment. Multiple gamut-mapping strategies may occur simultaneously, as it may be desired to use more than one strategy on a single page (for pictorial and presentation graphic images, for example). The result of the user-defined modifications and the gamut mapping transforms is the modified colorimetry 200, which is still expressed in terms of the reference viewing environment.

Modified data are then coupled to any of a plurality of output devices (FIG. 11c). Video previewing on calibrated video display 208 is accomplished by first transforming the image data from modified colorimetry 200 by viewing environment transformation for video display 202 which incorporates output transformation techniques previously described and which are illustrated in FIGS. 9 and 10. This transform includes chromatic adaptation transforms, surround transforms, and flare corrections as required to account for any differences between the actual viewing conditions for the video display and those of the reference environment. If the purpose of the video display is to preview an image to be subsequently produced by another output device/medium, an additional video-related gamut mapping is performed by gamut mapping for video preview 204, derived so as to appropriately adjust any colors that are within the gamut of the specified output device/medium, but outside of the gamut of the video display in order to obtain an optimum video preview of the image. The code values (video drive signals) for the display are then determined using transformation of colorimetry to video code values 206, developed using the previously described output calibration techniques.

Reflection prints are made by sending image data to a colorimetrically-calibrated reflection print writer/Medium 216. Image data from modified colorimetry 200 to be sent for output are first transformed by viewing environment transformation for reflection print 210. This transform, derived using the techniques of the first embodiment, incorporate chromatic adaptation transforms and flare corrections required to account for any differences between the actual viewing conditions for the output print and those of the reference environment. The code values (writer drive values) for the writer are determined using transformation of colorimetry to writer code values 214 using the previously described output calibration techniques.

Transparencies are made by coupling image data to a colorimetrically-calibrated transparency writer/medium 224, calibrated using the previously described output calibration techniques. Image data are first transformed by viewing environment transformation for transparency 218. This transform, derived using the techniques of the second embodiment, incorporates chromatic adaptation transforms, surround transforms, and flare corrections as required to account for any differences between the actual viewing conditions for the transparency and those of the reference environment. The code values (writer drive values) for the writer are determined using transformation of colorimetry to writer code values 222, determined according to the previously described output device calibration techniques.

Photographic negatives are made by sending image data to a calibrated negative writer/medium 232. Image data are first transformed by viewing environment transformation for rendered output 226. This transform, derived using previously described techniques, incorporates chromatic adaptation transforms, surround transforms, and flare corrections as required to account for any differences between the actual viewing conditions for the rendered output image and those of the reference environment. Transformed data are then further transformed by transformation of colorimetry to printing density values 228. This transform incorporates a model of the photographic paper or other complementary medium onto which the writer-produced negative will be printed. This model relates desired output medium colorimetry to the printing density values, i.e., the negative log of the factor by which the negative attenuates the exposure to the photographic printing medium, required to produce that colorimetry. Models relating print material colorimetry to printing densities values are well known to those skilled in the photographic arts. The drive values for the writer are determined using transformation of printing densities to writer code values 230. This transformation is derived from a printing-density model of the output negative and the calibrated writer. Alternatively, viewing-environment-transformed colorimetric values could be transformed directly to device drive values using the techniques of the third embodiment.

Black and white separations for graphic arts and other applications are made by sending image data to calibrated black and white film writer/medium 240. Image data are first transformed by viewing transformation for rendered output 234. This transform, derived using previously described techniques, incorporates chromatic adaptation transforms, surround transforms, and flare corrections as required to account for any differences between the actual viewing conditions for the rendered output image produced from the separations and those of the reference environment. Transformed data are then further transformed by transformation of colorimetry to percent dot values 236, derived using techniques known to those skilled in the graphic arts. This transform incorporates a model of the actual process in which the writer-produced separations will be used. The code values (writer drive values) for the writer are determined using transformation of percent dot values to writer code values 238, again using techniques known to those skilled in the graphic arts.

The system provides for writing image data directly to a data file for storage or for transfer to other systems. The data may be in the form of output file in colorimetric units 246, provided by viewing environment transformation for output 242 and colorimetric conversion 244. The data may also be in the form of output file device-specific units 252, such as device drive values, colorant amounts, RGB intensities, etc., provided by viewing environment transformation for output 248 and transformation to device-specific units 250, which may be formed using the colorimetric calibration techniques described in the fourth embodiment of the image encoding mechanism.

Figure 12:
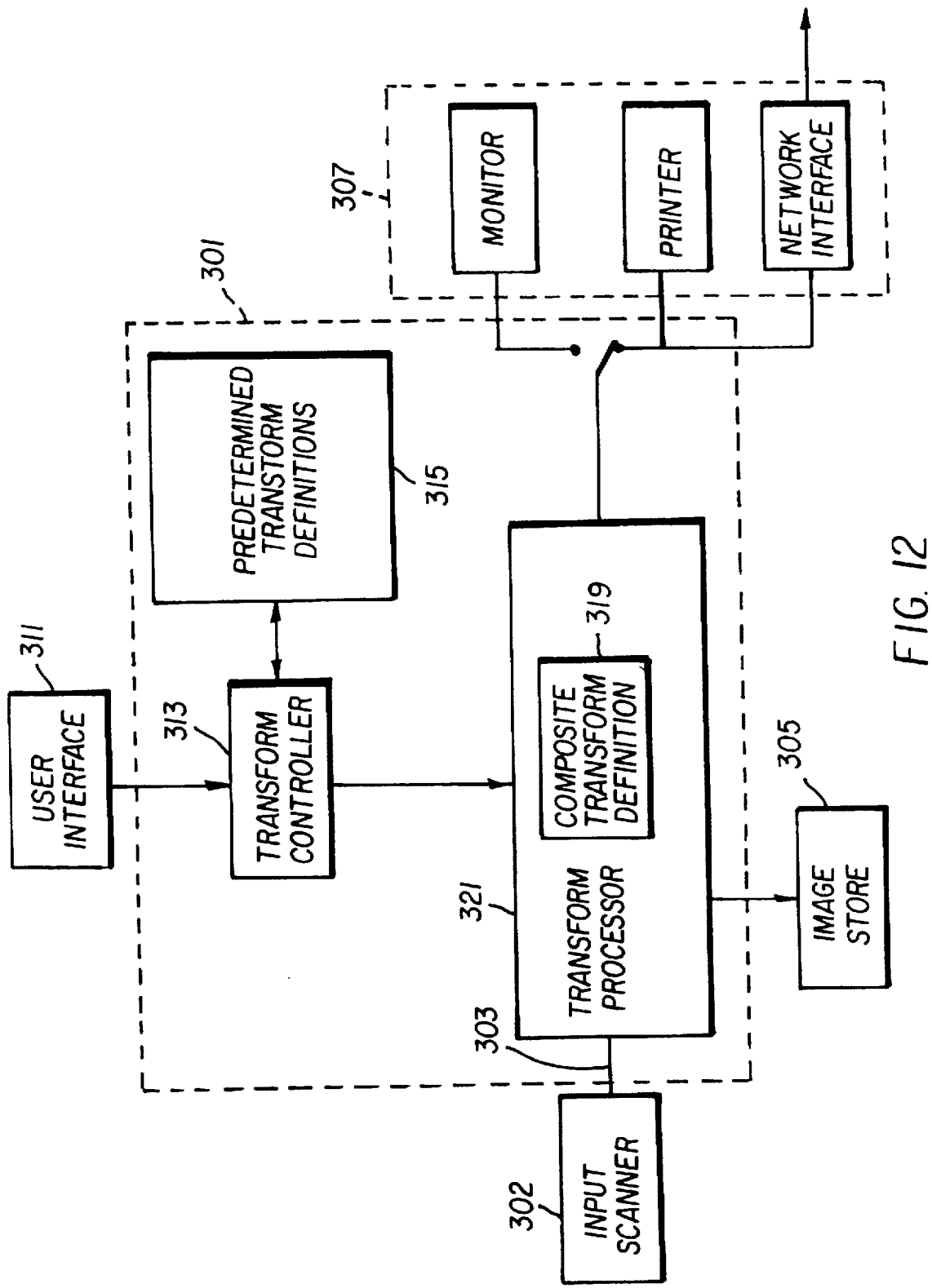
FIGS. 12, 13 and 14 are respective block diagrams of a composite transform generating system described in the above-referenced '911 Patent and employed in the imagery data processing flow paths of the color reproduction processing system diagrammatically illustrated in FIGS. 11a, 11b and 11c.

Referring now to FIG. 12, which generally corresponds to FIG. 2 of the '911 Patent, the composite transform generating system described in the above-referenced '911 Patent and employed in the imagery data processing flow paths of the color reproduction processing system diagrammatically illustrated in FIGS. 11a, 11b and 11c, is diagrammatically illustrated as comprising an image processor 301, which adjusts the colors of an input or source digital image 303 to be processed, such as one supplied by an input scanner 302, and either stores the adjusted image in an image storage device 305, or forwards it to one or more downstream image target devices 307. For example, in each of the image processing flow paths of FIG. 11a, where the input image is derived from a respectively different one of a variety of the above described input devices 112, 118, 126, 134, 144, 154, 162, 168, 176 and 182, the input image is subjected to a sequence of transform operations and then applied to the database color encoding 190 (the target device) of FIG. 11b. In the image processing flow path of FIG. 11b, the processed image outputs of FIG. 11a are subjected to a sequence of user-defined modifications 194, gamut mapping strategy 196, 198 to a modified image in modified colorimetry 200. This modified colorimetry image 200 is then applied to the output image processing flow path of FIG. 11c, in each respective processing path of which the image is subjected to a sequence of transform operations and coupled to a respective one of associated target/output devices 208, 216, 224, 232, 240, 246 and 252.

Image processor 301 is connected to a user interface 311 through which a user indicates the desired transformations to be performed on a digital image. In general, image processor 301 and user interface 311 are implemented with a properly programmed general purpose computer or computer workstation. As described in the '911 Patent, in response to the user's request, in one mode of operation, a transform controller 313 selects a set of definitions from a collection of stored predetermined transform definitions 315. Each predetermined transform definition describes a unique transform for mapping the values representing each color of an image in a first color space to a different set of values (e.g. a different color in a different color space) thus yielding a desired image transformation. The user or digital image processing workstation operator may also create his own custom transform definition. For example, the user interface allows the user to select a set of colors to be changed (e.g., from a palate of possible colors). The user can then specify the desired changes to these colors (e.g., a specific increase in brightness). In response to these selections, the transform controller 313 can then prepare a custom transform definition corresponding to the user's selections. Such custom transforms may be created by modifying predetermined transforms or by generating entirely new transforms based on the user's input.

Figure 13:
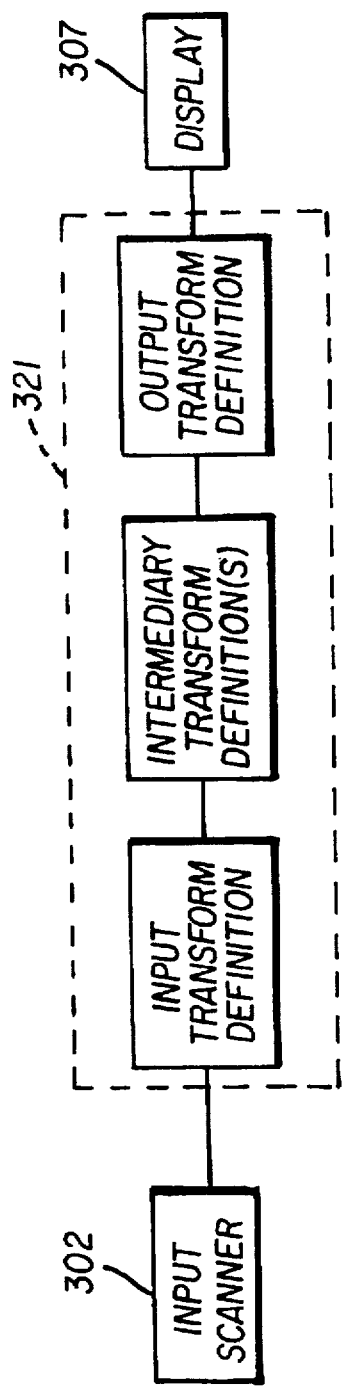
Figure 14:
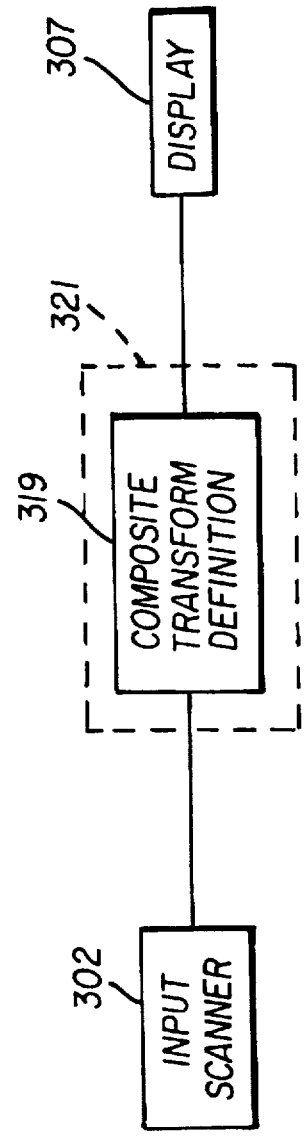

As described in the '911 Patent, in accordance with user's instructions, the transform controller 313 is operative to compose the selected transform definitions into a single composite transform definition 319, as diagrammatically illustrated in FIGS. 13 and 14, for processing the image without intermediate storage. This selection of an composition operation is performed with sufficient speed to allow the user to interact with the system, altering his selections until the system outputs the desired image. Alternatively, transform controller 313 can instruct image processor 301 to process an image in accordance with an input transform definition and store the processed image in storage device 305. Transform controller 313 can then compose the remaining selected transform definitions for processing the stored image at a later time. Transform controller 313 provides a composite transform definition to a transform processor 321, which implements the transform in accordance with the composite transform definition 319. For further details of the transform compositing mechanism shown diagrammatically in FIGS. 12–14, attention may be directed to the '911 Patent. By employing the transform compositing mechanism described therein, any number of the transformations of each of the image process flow paths of FIGS. 11a, 11b, 11c may be reduced to a single composite transform. For example, the compositing mechanism may be applied to composite one or more (including all) of the transformation operators in the combined flow path of FIGS. 11a and 11b, the combined flow path of FIGS. 11b and 11c, or the overall image processing flow path of FIGS. 11a, 11b and 11c.

While we have shown and described an embodiment in accordance with the present invention, it is to be understood that the same is not limited thereto but is susceptible to numerous changes and modifications as known to a person skilled in the art, and we therefore do not wish to be limited to the details shown and described herein but intend to cover all such changes and modifications as are obvious to one of ordinary skill in the art.

PARTS LIST

12 Reflection medium
14 Reflection scanner
16 Positive transparency medium

18 Transmission scanner
20 Negative medium
22 Transmission scanner
24 Electronic imaging source
26 Workstation (computer-based)
28 Storage devices
30 Video display
32 Control apparatus
34 Output device
36 Output medium
40 Pattern generator
42 Image-forming apparatus
44 Test images
45 Printer
46 Test images
48 Colorimetric measuring device
50 Viewing-flare transform
51 Surround-transform
52 Chromatic adaptation transform
54 Colorimetric conversion
56 Transform apparatus
58 Transform
59 Transform
60 Transform
61 Transform
62 Signal-forming apparatus
64 Test images
66 Image-rendering apparatus/medium
68 Signal-forming apparatus
70 (Image-forming). Output device/medium
72 Transform
73 Transform
74 Transform
76 Transform
77 Transform
78 Transform
112 Electronic image sources
114 Rendering transformations
116 Colorimetric conversion
118 Reflection prints
120 Colorimetric Scanner
122 Viewing transformation
124 Colorimetric conversion
126 Photographic and other transparencies
128 Colorimetric scanner
130 Viewing transformation
132 Colorimetric conversion
134 Reflection prints
136 RGB scanner
138 Transform to colorimetry
140 Viewing transformation
142 Colorimetric conversion
144 Transparencies
146 RGB scanner
148 Transform to colorimetry
150 Viewing transformation
152 Colorimetric conversion
154 Negatives
156 RGB scanner
158 Rendering transformations
160 Colorimetric conversion
162 Video capture device
164 Rendering transformations
166 Colorimetric conversion
168 Video monitor
170 Transform to colorimetry
172 Viewing transformation
174 Colorimetric conversion
176 Colorimetrically-specified values
178 Viewing transformation
180 Colorimetric conversion
182 (CMYK) reflection data
184 Transformation to colorimetry
186 Viewing transformation
188 Colorimetric conversion
190 Database Color Encoding
194 User-defined modifications
196 Gamut mapping strategies
198 Gamut mapping strategies
200 Modified colorimetry
202 Viewing environment transformation for video display
204 Gamut mapping for video preview
206 Transformation of colorimetry to video code values
208 Video display
210 Viewing environment transformation for reflection print
214 Transformation of colorimetry to writer code values
216 Reflection print writer/medium
218 Viewing environment transformation for transparency
222 Transformation of colorimetry to writer code values
224 Transparency writer/medium
226 Viewing environment transformation for rendered output
228 Transformation of colorimetry to printing densities
230 Transformation of printing densities to writer code values
232 Negative writer/medium
234 Viewing environment transformation for rendered output
236 Transformation of colorimetry to percent dot values
238 Transformation of percent dot values to writer code values
240 B & W Film writer/medium
242 viewing environment transformation for output
244 Colorimetric conversion
246 Output file in colorimetric units
248 Viewing environment transformation for output
250 Transformation to device-specific units
252 Output file device-specific units
301 image processor
302 input scanner
303 input digital image
305 image storage device
307 image target device
311 user interface
313 transform controller
315 predetermined transform definition collection
319 composite transform definition
321 transform processor

We claim:

1. A method for forming a composite transform for transforming color-image data encoding values to image-bearing signals for producing output images with an output imaging means, comprising the steps of:

a) specifying an encoded-image viewing environment in terms of its amount of viewing flare light, surround type, and adaptive white point chromaticities;

b) specifying an output-image viewing environment in terms of its illuminant spectral energy distribution, amount of viewing flare light, surround type, and adaptive white point chromaticities;

c) specifying patterns of test color-image data encoding values which adequately sample and cover the color-image data encoding value range;

d) adjusting said test color-image data encoding values in accordance with the difference in the amounts of viewing flare light specified for the encoded-image viewing environment and the output-image viewing environment to form flare-adjusted colorimetric values;

e) adjusting said flare-adjusted colorimetric values in accordance with the difference in the surround types specified for the encoded-image viewing environment and the output-image viewing environment to form surround-adjusted colorimetric values;

f) adjusting said surround-adjusted colorimetric values in accordance with the difference between the adaptive white point chromaticities specified for the encoded-image viewing environment and the output-image viewing environment to form first output colorimetric values;

g) adjusting said first output colorimetric values in accordance with the color gamut capabilities of said output imaging means;

h) specifying patterns of image-bearing signals for producing colors which adequately sample and cover the useful color-range of an output imaging means;

i) forming output test colors with said output imaging means using said image-bearing signals;

j) determining second output colorimetric values from said output test colors and the output-image viewing environment illuminant;

k) forming at least one interim transform by relating said second output colorimetric values to corresponding test color image-bearing signals;

l) utilizing the at least one interim transform to transform the adjusted output colorimetric values of step g) to form imaging means' image-bearing signals;

m) deriving a sequence of least one transformation relating the image-bearing signals of step l) to the test color-image data encoding values of step c); and n) forming the composite transform from said sequence of at least one transformation.

2. The method according to claim 1 and further comprising the step of:

o) applying the composite transform to the color-image data encoding values to form imaging means' image-bearing signals.

3. A method for forming a composite transform for transforming image-bearing signals derived from input images formed by an imaging means to output colorimetric values, comprising the steps of:

a) specifying an input-image viewing environment in terms of its illuminant spectral energy distribution, amount of viewing flare light, surround type, and adaptive white point chromaticities;

b) specifying an encoded-image viewing environment in terms of its amount of viewing flare light, surround type, and adaptive white point chromaticities;

c) specifying an output-image viewing environment in terms of its amount of viewing flare light, surround type, and adaptive white point chromaticities;

d) specifying patterns of image-forming values for producing colors which adequately sample and cover the useful color-range of an imaging means;

e) forming test colors with said imaging means using said image-forming values;

f) determining colorimetric values from said test colors and the input-image viewing environment illuminant;

g) adjusting said colorimetric values in accordance with the difference in the amounts of viewing flare light specified for the input-image viewing environment and the encoded-image viewing environment to form first flare-adjusted colorimetric values;

h) adjusting said first flare-adjusted colorimetric values in accordance with the difference in the surround types specified for the input-image viewing environment and the encoded-image viewing environment to form first surround-adjusted colorimetric values;

i) adjusting said first surround-adjusted colorimetric values in accordance with the difference between the adaptive white point chromaticities specified for the input-image viewing environment and the encoded-image viewing environment to form color-image data encoding values;

j) adjusting said color-image data encoding values in accordance with the difference in the amounts of viewing flare light specified for the encoded-image viewing environment and the output-image viewing environment to form second flare-adjusted colorimetric values;

k) adjusting said second flare-adjusted colorimetric values in accordance with the difference in the surround types specified for the encoded-image viewing environment and the output-image viewing environment to form second surround-adjusted colorimetric values;

l) adjusting said second surround-adjusted colorimetric values in accordance with the difference between the adaptive white point chromaticities specified for the encoded-image viewing environment and the output-image viewing environment to form test color output colorimetric values;

m) sensing said test colors using an image-sensing means to form test color image-bearing signals;

n) deriving a sequence of at least one transformation relating said test color image-bearing signals to said corresponding test color output colorimetric values; and o) forming the composite transform from said sequence of at least one transformation.

4. The method according to claim 3 and further comprising the step of:

p) applying the composite transform to the image-bearing signals derived from input images formed by the imaging means to form output colorimetric values.

5. A method for forming a composite transform for transforming image-bearing signals derived from input images formed by an imaging means to output colorimetric values, comprising the steps of:

a) specifying an input-image viewing environment in terms of its illuminant spectral energy distribution, amount of viewing flare light, surround type, and adaptive white point chromaticities;

b) specifying an encoded-image viewing environment in terms of its amount of viewing flare light, surround type, and adaptive white point chromaticities;

c) specifying an output-image viewing environment in terms of its amount of viewing flare light, surround type, and adaptive white point chromaticities;

d) specifying patterns of image-forming values for producing colors which adequately sample and cover the useful color-range of an imaging means;

e) forming test colors with said imaging means using said image-forming values;

f) forming rendered test colors on a secondary imaging means from said imaging means test colors;

g) determining colorimetric values from said rendered test colors and the input-image viewing environment illuminant;

h) adjusting said colorimetric values in accordance with the difference in the amounts of viewing flare light specified for the input-image viewing environment and the encoded-image viewing environment to form first flare-adjusted colorimetric values;

i) adjusting said first flare-adjusted colorimetric values in accordance with the difference in the surround types specified for the input-image viewing environment and the encoded-image viewing environment to first form surround-adjusted colorimetric values;

j) adjusting said first surround-adjusted colorimetric values in accordance with the difference between the adaptive white point chromaticities specified for the input-image viewing environment and the encoded-image viewing environment to form color-image data encoding values;

k) adjusting said color-image data encoding values in accordance with the difference in the amounts of viewing flare light specified for the encoded-image viewing environment and the output-image viewing environment to form second flare-adjusted colorimetric values;

l) adjusting said second flare-adjusted colorimetric values in accordance with the difference in the surround types specified for the encoded-image viewing environment and the output-image viewing environment to form second surround-adjusted colorimetric values;

m) adjusting said second surround-adjusted colorimetric values in accordance with the difference between the adaptive white point chromaticities specified for the encoded-image viewing environment and the output-image viewing environment to form test color output colorimetric values;

n) sensing said formed imaging means test colors using an image-sensing means to form test color image-bearing signals;

o) deriving a sequence of at least one transformation relating said test color image-bearing signals to said corresponding test color output colorimetric values; and p) forming the composite transform from said sequence of at least one transformation.

6. The method according to claim 5 and further comprising the step of:

q) applying the composite transform to the image-bearing signals derived from input images formed by the imaging means to form output colorimetric values.

7. A method for forming a composite transform for transforming image-bearing signals derived from an electronic imaging source to output colorimetric values, comprising the steps of:

a) specifying an input-image viewing environment in terms of its illuminant spectral energy distribution, amount of viewing flare light, surround type, and adaptive white point chromaticities;

b) specifying an encoded-image viewing environment in terms of its amount of viewing flare light, surround type, and adaptive white point chromaticities;

c) specifying an output-image viewing environment in terms of its amount of viewing flare light, surround type, and adaptive white point chromaticities;

d) specifying patterns of test image values which adequately sample and cover the useful image value range of an electronic imaging source;

e) forming rendered test colors on an image rendering means using said specified test image values;

f) determining colorimetric values from said rendered test colors and the input-image viewing environment illuminant;

g) adjusting said colorimetric values in accordance with the difference in the amounts of viewing flare light specified for the input-image viewing environment and the encoded-image viewing environment to form first flare-adjusted colorimetric values;

h) adjusting said first flare-adjusted colorimetric values in accordance with the difference in the surround types specified for the input-image viewing environment and the encoded-image viewing environment to form first surround-adjusted colorimetric values;

i) adjusting said first surround-adjusted colorimetric values in accordance with the difference between the adaptive white point chromaticities specified for the input-image viewing environment and the encoded-image viewing environment to form color-image data encoding values;

j) adjusting said color-image data encoding values in accordance with the difference in the amounts of viewing flare light specified for the encoded-image viewing environment and the output-image viewing environment to form second flare-adjusted colorimetric values;

k) adjusting said second flare-adjusted colorimetric values in accordance with the difference in the surround types specified for the encoded-image viewing environment and the output-image viewing environment to form second surround-adjusted colorimetric values;

l) adjusting said second surround-adjusted colorimetric values in accordance with the difference between the adaptive white point chromaticities specified for the encoded-image viewing environment and the output-image viewing environment to form test color output colorimetric values;

m) forming test color image-bearing signals from said specified test image values;

n) deriving a sequence of at least one transformation relating said test color image-bearing signals to said corresponding test color output colorimetric values; and o) forming the composite transform from said sequence of at least one transformation.

8. The method according to claim 7 and further comprising the step of:

p) applying the composite transform to the image-bearing signals from the electronic imaging source to form output colorimetric values.

9. A method for forming a composite transform for transforming colorimetrically-specified values to output colorimetric values, comprising the steps of:

a) specifying an input-image viewing environment in terms of its illuminant spectral energy distribution, amount of viewing flare light, surround type, and adaptive white point chromaticities;

b) specifying an encoded-image viewing environment in terms of its amount of viewing flare light, surround type, and adaptive white point chromaticities;

c) specifying an output-image viewing environment in terms of its amount of viewing flare light, surround type, and adaptive white point chromaticities;

d) generating colorimetrically-specified test color values which adequately sample and cover the useful colorimetric value range;

e) adjusting said colorimetric values in accordance with the difference in the amounts of viewing flare light specified for the input-image viewing environment and the encoded-image viewing environment to form first flare-adjusted colorimetric values;

f) adjusting said first flare-adjusted colorimetric values in accordance with the difference in the surround types specified for the input-image viewing environment and the encoded-image viewing environment to form first surround-adjusted colorimetric values;

g) adjusting said first surround-adjusted colorimetric values in accordance with the difference between the adaptive white point chromaticities specified for the input-image viewing environment and the encoded-image viewing environment to form color-image data encoding values;

h) adjusting said color-image data encoding values in accordance with the difference in the amounts of viewing flare light specified for the encoded-image viewing environment and the output-image viewing environment to form second flare-adjusted colorimetric values;

i) adjusting said second flare-adjusted colorimetric values in accordance with the difference in the surround types specified for the encoded-image viewing environment and the output-image viewing environment to form second surround-adjusted colorimetric values;

j) adjusting said second surround-adjusted colorimetric values in accordance with the difference between the adaptive white point chromaticities specified for the encoded-image viewing environment and the output-image viewing environment to form test color output colorimetric values;

k) deriving a sequence of at least one transformation relating said colorimetrically-specified test color values to said test color output colorimetric values; and l) forming the composite transform from said sequence of at least one transformation.

10. The method according to claim 9 and further comprising the step of:

m) applying the composite transform to the colorimetric values to form output colorimetric values.

11. A method for forming a composite transform for transforming imaging device drive values for producing images to output colorimetric values, comprising the steps of:

a) specifying an input-image viewing environment in terms of its illuminant spectral energy distribution, amount of viewing flare light, surround type, and adaptive white point chromaticities;

b) specifying an encoded-image viewing environment in terms of its amount of viewing flare light, surround type, and adaptive white point chromaticities;

c) specifying an output-image viewing environment in terms of its amount of viewing flare light, surround type, and adaptive white point chromaticities;

d) specifying patterns of imaging device test drive values for producing imaging device test colors which adequately sample and cover the useful color range of said imaging device;

e) determining colorimetric values from said imaging device test colors and the input-image viewing environment illuminant;

f) adjusting said colorimetric values in accordance with the difference in the amounts of viewing flare light specified for the input-image viewing environment and the encoded-image viewing environment to form first flare-adjusted colorimetric values;

g) adjusting said first flare-adjusted colorimetric values in accordance with the difference in the surround types specified for the input-image viewing environment and the encoded-image viewing environment to form first surround-adjusted colorimetric values;

h) adjusting said first surround-adjusted colorimetric values in accordance with the difference between the adaptive white point chromaticities specified for the input-image viewing environment and the encoded-image viewing environment to form color-image data encoding values;

i) adjusting said color-image data encoding values in accordance with the difference in the amounts of viewing flare light specified for the encoded-image viewing environment and the output-image viewing environment to form second flare-adjusted colorimetric values;

j) adjusting said second flare-adjusted colorimetric values in accordance with the difference in the surround types specified for the encoded-image viewing environment and the output-image viewing environment to form second surround-adjusted colorimetric values;

k) adjusting said second surround-adjusted colorimetric values in accordance with the difference between the adaptive white point chromaticities specified for the encoded-image viewing environment and the output-image viewing environment to form test color output colorimetric values;

l) deriving a sequence of at least one transformation relating said imaging device test drive values to said corresponding test color output colorimetric values; and m) forming the composite transform from said sequence of at least one transformation.

12. The method according to claim 11 and further comprising the step of:

n) applying the composite transform to the imaging device drive values to form output colorimetric values.

13. A method for forming a composite transform for transforming image-bearing signals derived from input images formed by an imaging means to image-bearing signals for producing output images with an output imaging means, comprising the steps of:

a) specifying an input-image viewing environment in terms of its illuminant spectral energy distribution, amount of viewing flare light, surround type, and adaptive white point chromaticities;

b) specifying an encoded-image viewing environment in terms of its amount of viewing flare light, surround type, and adaptive white point chromaticities;

c) specifying an output-image viewing environment in terms of its amount of viewing flare light, surround type, and adaptive white point chromaticities;

d) specifying patterns of image-forming values for producing colors which adequately sample and cover the useful color-range of an imaging means;

e) forming test colors with said imaging means using said image-forming values;

f) determining colorimetric values from said test colors and the input-image viewing environment illuminant;

g) adjusting said colorimetric values in accordance with the difference in the amounts of viewing flare light specified for the input-image viewing environment and the encoded-image viewing environment to form first flare-adjusted colorimetric values;

h) adjusting said first flare-adjusted colorimetric values in accordance with the difference in the surround types specified for the input-image viewing environment and the encoded-image viewing environment to form first surround-adjusted colorimetric values;

i) adjusting said first surround-adjusted colorimetric values in accordance with the difference between the adaptive white point chromaticities specified for the input-image viewing environment and the encoded-image viewing environment to form color-image data encoding values;

j) adjusting said color-image data encoding values in accordance with the difference in the amounts of viewing flare light specified for the encoded-image viewing environment and the output-image viewing environment to form second flare-adjusted colorimetric values;

k) adjusting said second flare-adjusted colorimetric values in accordance with the difference in the surround types specified for the encoded-image viewing environment and the output-image viewing environment to form second surround-adjusted colorimetric values;

l) adjusting said second surround-adjusted colorimetric values in accordance with the difference between the adaptive white point chromaticities specified for the encoded-image viewing environment and the output-image viewing environment to form first test color output colorimetric values;

m) adjusting said first test color output colorimetric values in accordance with the color gamut capabilities of said output imaging means to form second test color output colorimetric values;

n) specifying patterns of interim image-bearing signals for producing colors which adequately sample and cover the useful color-range of said output imaging means;

o) forming interim output test colors with said output imaging means using said interim image-bearing signals;

p) determining interim test color output colorimetric values from said interim output test colors and the output-image viewing environment illuminant;

q) forming at least one interim transform by relating said interim test color output colorimetric values to corresponding interim test color image-bearing signals;

r) utilizing the at least one interim transform to transform said second test color output colorimetric values to form imaging means' image-bearing signals;

s) sensing said test colors using an image-sensing means to form test color image-bearing signals;

t) deriving a sequence of at least one transformation relating said test color image-bearing signals to said corresponding imaging means' image-bearing signals; and u) forming the composite transform from said sequence of at least one transformation.

14. The method according to claim 13 and further comprising the step of:

v) applying the composite transform to the image-bearing signals derived from input images formed by the imaging means to form imaging means' image-bearing signals.

15. A method for forming a composite transform for transforming image-bearing signals derived from input images formed by an imaging means to image-bearing signals for producing output images with an output imaging means, comprising the steps of:

a) specifying an input-image viewing environment in terms of its illuminant spectral energy distribution, amount of viewing flare light, surround type, and adaptive white point chromaticities;

b) specifying an encoded-image viewing environment in terms of its amount of viewing flare light, surround type, and adaptive white point chromaticities;

c) specifying an output-image viewing environment in terms of its amount of viewing flare light, surround type, and adaptive white point chromaticities;

d) specifying patterns of image-forming values for producing colors which adequately sample and cover the useful color-range of an imaging means;

e) forming test colors with said imaging means using said image-forming values;

f) forming rendered test colors on a secondary imaging means from said imaging means test colors;

g) determining colorimetric values from said rendered test colors and the input-image viewing environment illuminant;

h) adjusting said colorimetric values in accordance with the difference in the amounts of viewing flare light specified for the input-image viewing environment and the encoded-image viewing environment to form first flare-adjusted colorimetric values;

i) adjusting said first flare-adjusted colorimetric values in accordance with the difference in the surround types specified for the input-image viewing environment and the encoded-image viewing environment to form first surround-adjusted colorimetric values;

j) adjusting said first surround-adjusted colorimetric values in accordance with the difference between the adaptive white point chromaticities specified for the input-image viewing environment and the encoded-image viewing environment to form color-image data encoding values;

k) adjusting said color-image data encoding values in accordance with the difference in the amounts of viewing flare light specified for the encoded-image viewing environment and the output-image viewing environment to form second flare-adjusted colorimetric values;

l) adjusting said second flare-adjusted colorimetric values in accordance with the difference in the surround types specified for the encoded-image viewing environment and the output-image viewing environment to form second surround-adjusted colorimetric values;

m) adjusting said second surround-adjusted colorimetric values in accordance with the difference between the adaptive white point chromaticities specified for the encoded-image viewing environment and the output-image viewing environment to form first test color output colorimetric values;

n) adjusting said first test color output colorimetric values in accordance with the color gamut capabilities of said output imaging means to form second test color output colorimetric values;

o) specifying patterns of interim image-bearing signals for producing colors which adequately sample and cover the useful color-range of said output imaging means;

p) forming interim output test colors with said output imaging means using said interim image-bearing signals;

q) determining interim test color output colorimetric values from said interim output test colors and the output-image viewing environment illuminant;

r) forming at least one interim transform by relating said interim test color output colorimetric values to corresponding interim test color image-bearing signals;

s) utilizing the at least one interim transform to transform said second test color output colorimetric values to form imaging means' image-bearing signals;

t) sensing said test colors using an image-sensing means to form test color image-bearing signals;

u) deriving a sequence of at least one transformation relating said test color image-bearing signals to said corresponding imaging means' image-bearing signals; and v) forming the composite transform from said sequence of at least one transformation.

16. The method according to claim 15 and further comprising the step of:

w) applying the composite transform to the image-bearing signals derived from input images formed by the imaging means to form imaging means' image-bearing signals.

17. A method for forming a composite transform for transforming image-bearing signals derived from an electronic imaging source to image-bearing signals for producing output images with an output: imaging means, comprising the steps of:

a) specifying an input-image viewing environment in terms of its illuminant spectral energy distribution, amount of viewing flare light, surround type, and adaptive white point chromaticities;

b) specifying an encoded-image viewing environment in terms of its amount of viewing flare light, surround type, and adaptive white point chromaticities;

c) specifying an output-image viewing environment in terms of its amount of viewing flare light, surround type, and adaptive white point chromaticities;

d) specifying patterns of test image values which adequately sample and cover the useful image value range of an electronic imaging source;

e) forming rendered test colors on an image rendering means using said specified test image values;

f) determining colorimetric values from said rendered test colors and the input-image viewing environment illuminant;

g) adjusting said colorimetric values in accordance with the difference in the amounts of viewing flare light specified for the input-image viewing environment and the encoded-image viewing environment to form first flare-adjusted colorimetric values;

h) adjusting said first flare-adjusted colorimetric values in accordance with the difference in the surround types specified for the input-image viewing environment and the encoded-image viewing environment to form first surround-adjusted colorimetric values;

i) adjusting said first surround-adjusted colorimetric values in accordance with the difference between the adaptive white point chromaticities specified for the input-image viewing environment and the encoded-image viewing environment to form color-image data encoding values;

j) adjusting said color-image data encoding values in accordance with the difference in the amounts of viewing flare light specified for the encoded-image viewing environment and the output-image viewing environment to form second flare-adjusted colorimetric values;

k) adjusting said second flare-adjusted colorimetric values in accordance with the difference in the surround types specified for the encoded-image viewing environment and the output-image viewing environment to form second surround-adjusted colorimetric values;

l) adjusting said second surround-adjusted colorimetric values in accordance with the difference between the adaptive white point chromaticities specified for the encoded-image viewing environment and the output-image viewing environment to form first test color output colorimetric values;

m) adjusting said first test color output colorimetric values in accordance with the color gamut capabilities of said output imaging means to form second test color output colorimetric values;

n) specifying patterns of interim image-bearing signals for producing colors which adequately sample and cover the useful color-range of said output imaging means;

o) forming interim output test colors with said output imaging means using said interim image-bearing signals;

p) determining interim test color output colorimetric values from said interim output test colors and the output-image viewing environment illuminant;

q) forming at least one interim transform by relating said interim test color output colorimetric values to corresponding interim test color image-bearing signals;

r) utilizing the at least one interim transform to transform said second test color output colorimetric values to form imaging means' image-bearing signals;

s) deriving a sequence of at least one transformation relating said test image values to said corresponding imaging means' image-bearing signals; and t) forming the composite transform from said sequence of at least one transformation.

18. The method according to claim 17 and further comprising the step of:

u) applying the composite transform to the image-bearing signals derived from the electronic imaging source to form imaging means' image-bearing signals.

19. A method for forming a composite transform for transforming colorimetrically-specified values to image-bearing signals for producing output images with an output imaging means, comprising the steps of:

a) specifying an input-image viewing environment in terms of its illuminant spectral energy distribution, amount of viewing flare light, surround type, and adaptive white point chromaticities;

b) specifying an encoded-image viewing environment in terms of its amount of viewing flare light, surround type, and adaptive white point chromaticities;

c) specifying an output-image viewing environment in terms of its amount of viewing flare light, surround type, and adaptive white point chromaticities;

d) generating colorimetrically-specified test color values which adequately sample and cover the useful colorimetric value range;

e) adjusting said colorimetric values in accordance with the difference in the amounts of viewing flare light specified for the input-image viewing environment and the encoded-image viewing environment to form first flare-adjusted colorimetric values;

f) adjusting said first flare-adjusted colorimetric values in accordance with the difference in the surround types specified for the input-image viewing environment and the encoded-image viewing environment to form first surround-adjusted colorimetric values;

g) adjusting said first surround-adjusted colorimetric values in accordance with the difference between the adaptive white point chromaticities specified for the input-image viewing environment and the encoded-image viewing environment to form color-image data encoding values;

h) adjusting said color-image data encoding values in accordance with the difference in the amounts of viewing flare light specified for the encoded-image viewing environment and the output-image viewing environment to form second flare-adjusted colorimetric values;

i) adjusting said second flare-adjusted colorimetric values in accordance with the difference in the surround types specified for the encoded-image viewing environment and the output-image viewing environment to form second surround-adjusted colorimetric values;

j) adjusting said second surround-adjusted colorimetric values in accordance with the difference between the adaptive white point chromaticities specified for the encoded-image viewing environment and the output-image viewing environment to form first test color output colorimetric values;

k) adjusting said first test color output colorimetric values in accordance with the color gamut capabilities of said output imaging means to form second test color output colorimetric values;

l) specifying patterns of interim image-bearing signals for producing colors which adequately sample and cover the useful color-range of said output imaging means;

m) forming interim output test colors with said output imaging means using said interim image-bearing signals;

n) determining interim test color output colorimetric values from said interim output test colors and the output-image viewing environment illuminant;

o) forming at least one interim transform by relating said interim test color output colorimetric values to corresponding interim test color image-bearing signals;

p) utilizing the at least one interim transform to transform said second test color output colorimetric values to form imaging means' image-bearing signals;

q) deriving a sequence of at least one transformation relating said colorimetrically-specified test color values to said corresponding imaging means' image-bearing signals; and r) forming the composite transform from said sequence of at least one transformation.

20. The method according to claim 19 and further comprising the step of:

s) applying the composite transform to colorimetrically-specified values to form imaging means' image-bearing signals.

21. A method for forming a composite transform for transforming first imaging device drive values for producing images to second imaging device drive values for producing output images, comprising the steps of:

a) specifying an input-image viewing environment in terms of its illuminant spectral energy distribution, amount of viewing flare light, surround type, and adaptive white point chromaticities;

b) specifying an encoded-image viewing environment in terms of its amount of viewing flare light, surround type, and adaptive white point chromaticities;

c) specifying an output-image viewing environment in terms of its amount of viewing flare light, surround type, and adaptive white point chromaticities;

d) specifying patterns of first imaging device test drive values for producing imaging device test colors which adequately sample and cover the useful color range of said imaging device;

e) determining colorimetric values from said imaging device test colors and the input-image viewing environment illuminant;

f) adjusting said colorimetric values in accordance with the difference in the amounts of viewing flare light specified for the input-image viewing environment and the encoded-image viewing environment to form first flare-adjusted colorimetric values;

g) adjusting said first flare-adjusted colorimetric values in accordance with the difference in the surround types specified for the input-image viewing environment and the encoded-image viewing environment to form first surround-adjusted colorimetric values;

h) adjusting said first surround-adjusted colorimetric values in accordance with the difference between the adaptive white point chromaticities specified for the input-image viewing environment and the encoded-image viewing environment to form color-image data encoding values;

i) adjusting said color-image data encoding values in accordance with the difference in the amounts of viewing flare light specified for the encoded-image viewing environment and the output-image viewing environment to form second flare-adjusted colorimetric values;

j) adjusting said second flare-adjusted colorimetric values in accordance with the difference in the surround types specified for the encoded-image viewing environment and the output-image viewing environment to form second surround-adjusted colorimetric values;

k) adjusting said second surround-adjusted colorimetric values in accordance with the difference between the adaptive white point chromaticities specified for the encoded-image viewing environment and the output-image viewing environment to form first test color output colorimetric values;

l) adjusting said first test color output colorimetric values in accordance with the color gamut capabilities of said output imaging means to form second test color output colorimetric values;

m) specifying patterns of interim image-bearing signals for producing colors which adequately sample and cover the useful color-range of said output imaging means;

n) forming interim output test colors with said output imaging means using said interim image-bearing signals;

o) determining interim test color output colorimetric values from said interim output test colors and the output-image viewing environment illuminant;

p) forming at least one interim transform by relating said interim test color output colorimetric values to corresponding interim test color image-bearing signals;

q) utilizing the at least one interim transform to transform said second test color output colorimetric values to form imaging means' image-bearing signals;

r) deriving a sequence of at least one transformation relating said first imaging device test drive values to said corresponding imaging means' image-bearing signals; and s) forming the composite transform from said sequence of at least one transformation.

22. The method according to claim 21 and further comprising the step of:

t) applying the composite transform to a first imaging device's test drive values to form imaging means' image-bearing signals.

* * * * *